Feb. 7, 1950      I. E. COX      2,496,379

MACHINE TOOL

Filed Aug. 31, 1948      11 Sheets-Sheet 1

Inventor
Isaac Eugene Cox
By Wallace and Cannon
Attorneys

Feb. 7, 1950          I. E. COX          2,496,379
MACHINE TOOL
Filed Aug. 31, 1948          11 Sheets-Sheet 2
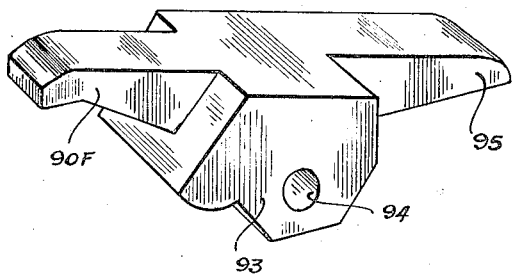
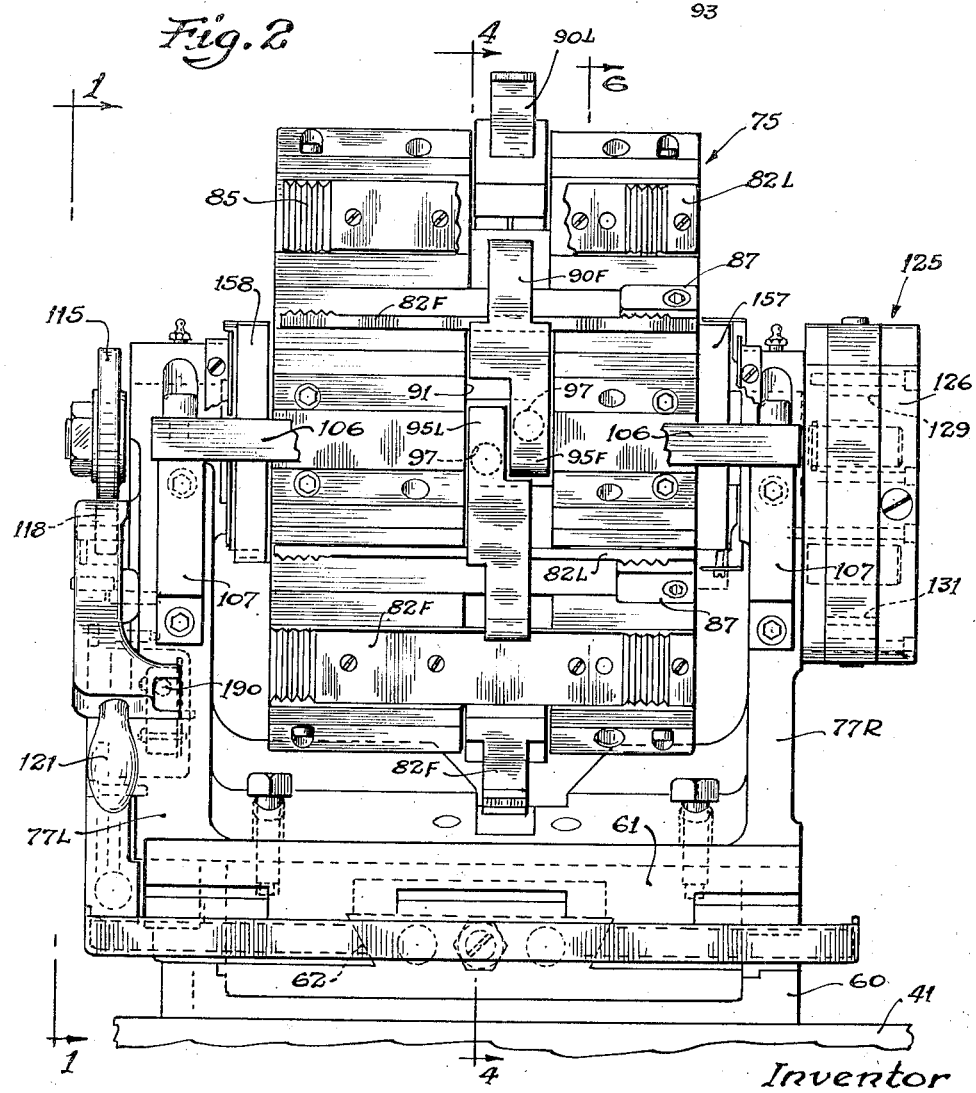
Inventor
Isaac Eugene Cox
By Wallace and Cannon
Attorneys Feb. 7, 1950        I. E. COX        2,496,379
MACHINE TOOL Filed Aug. 31, 1948        11 Sheets-Sheet 3

Inventor
Isaac Eugene Cox
By Wallace and Cannon
Attorneys

Feb. 7, 1950          I. E. COX          2,496,379
MACHINE TOOL
Filed Aug. 31, 1948          11 Sheets-Sheet 4
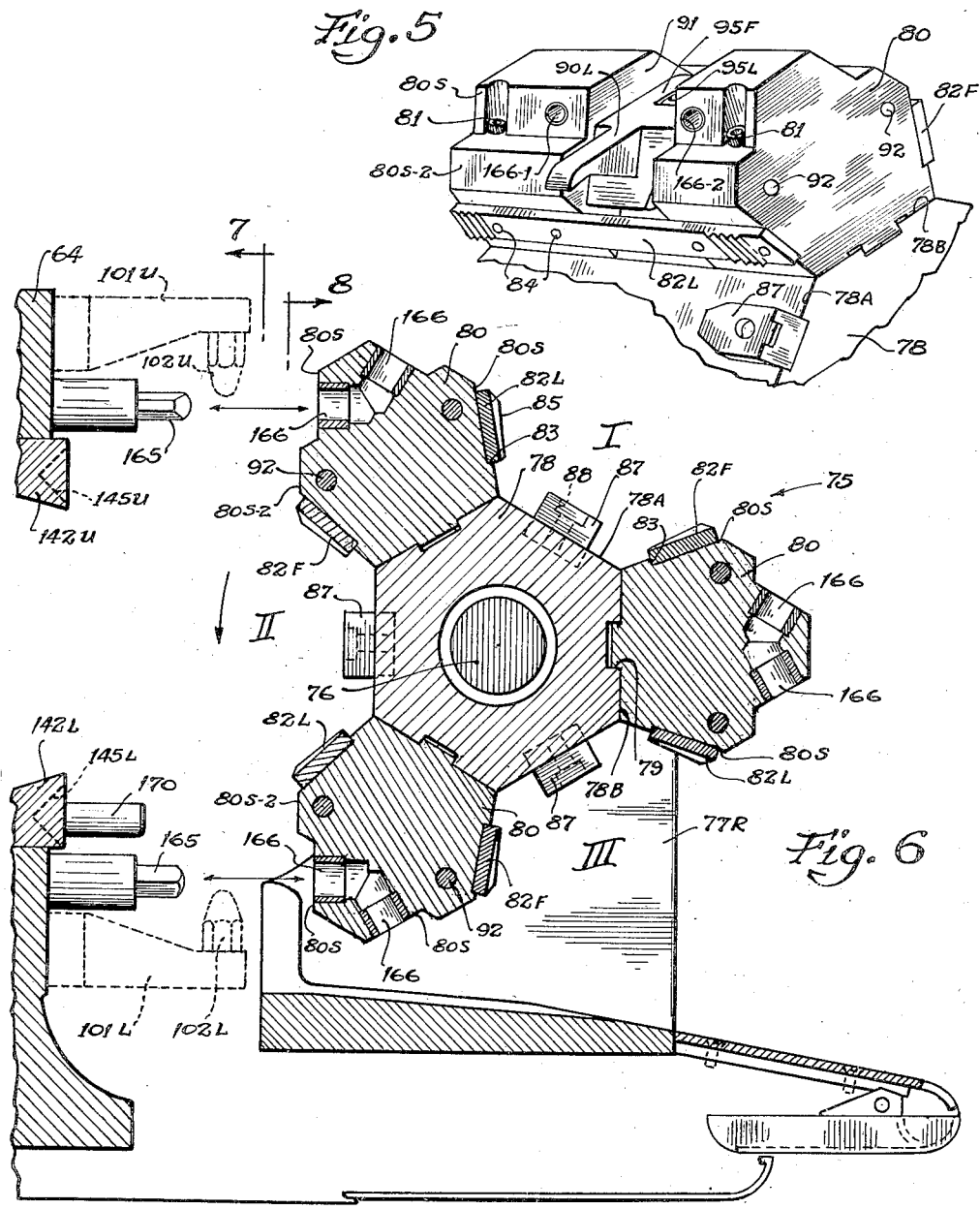
Inventor
Isaac Eugene Cox
By Wallace and Cannon
Attorneys

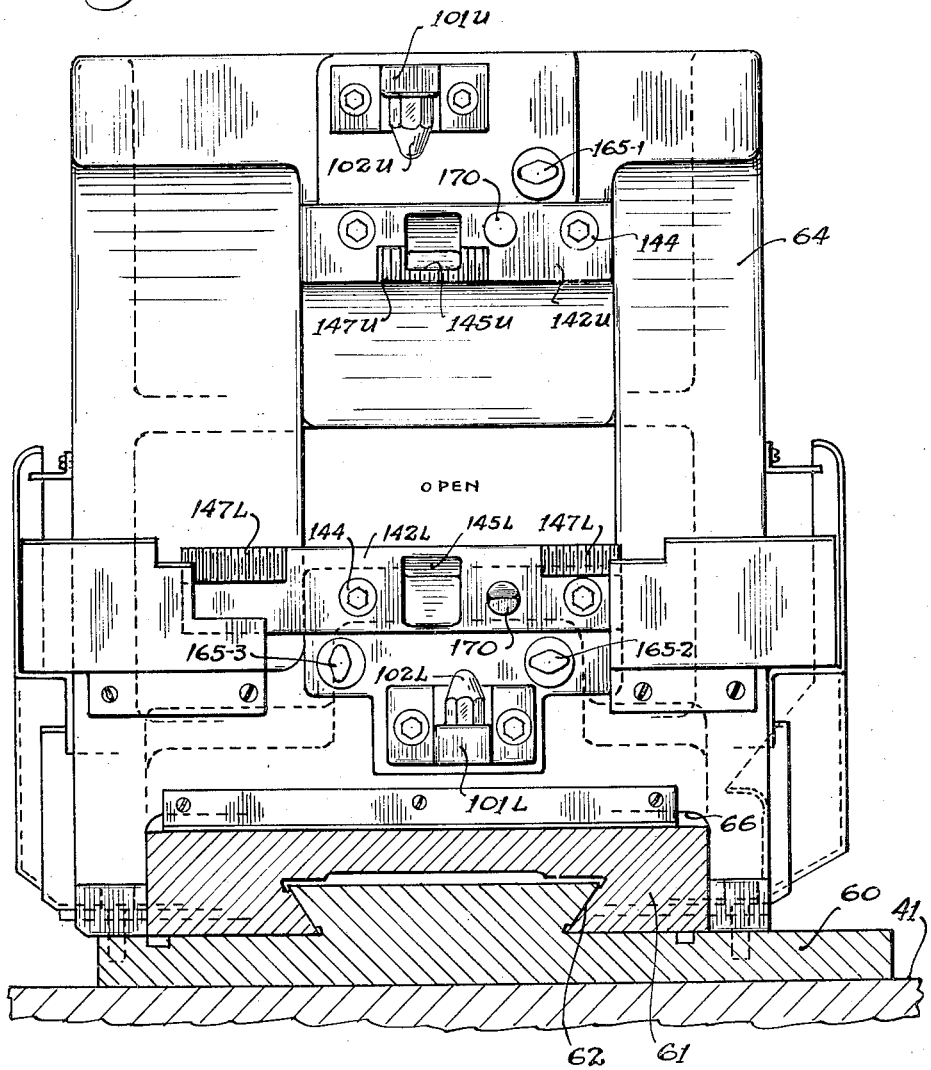

Feb. 7, 1950 — I. E. COX — 2,496,379
MACHINE TOOL
Filed Aug. 31, 1948 — 11 Sheets-Sheet 6

Inventor
Isaac Eugene Cox
By Wallace and Cannon
Attorneys

Feb. 7, 1950     I. E. COX     2,496,379
MACHINE TOOL
Filed Aug. 31, 1948     11 Sheets-Sheet 7
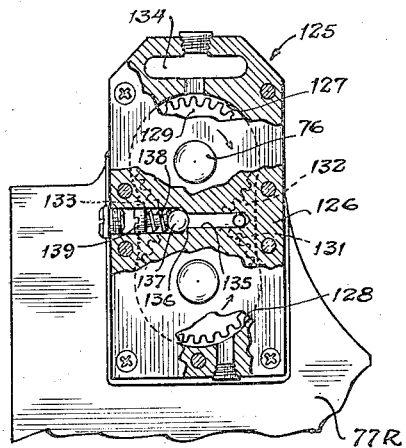
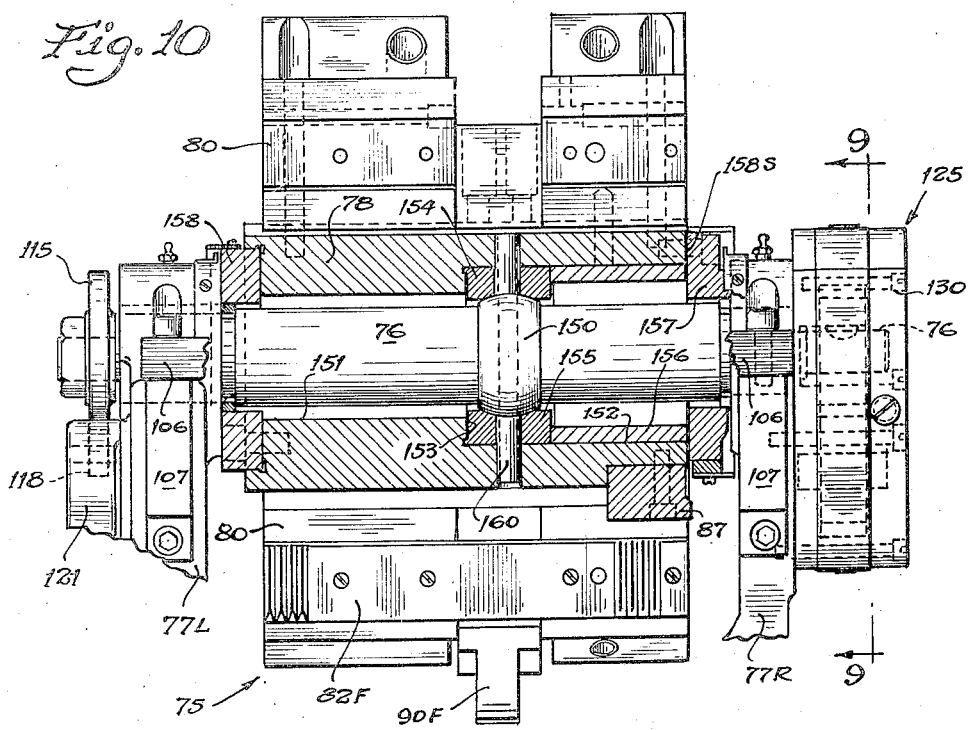
Inventor
Isaac Eugene Cox
By Wallace and Cannon
Attorneys Feb. 7, 1950        I. E. COX        2,496,379
MACHINE TOOL
Filed Aug. 31, 1948        11 Sheets-Sheet 8
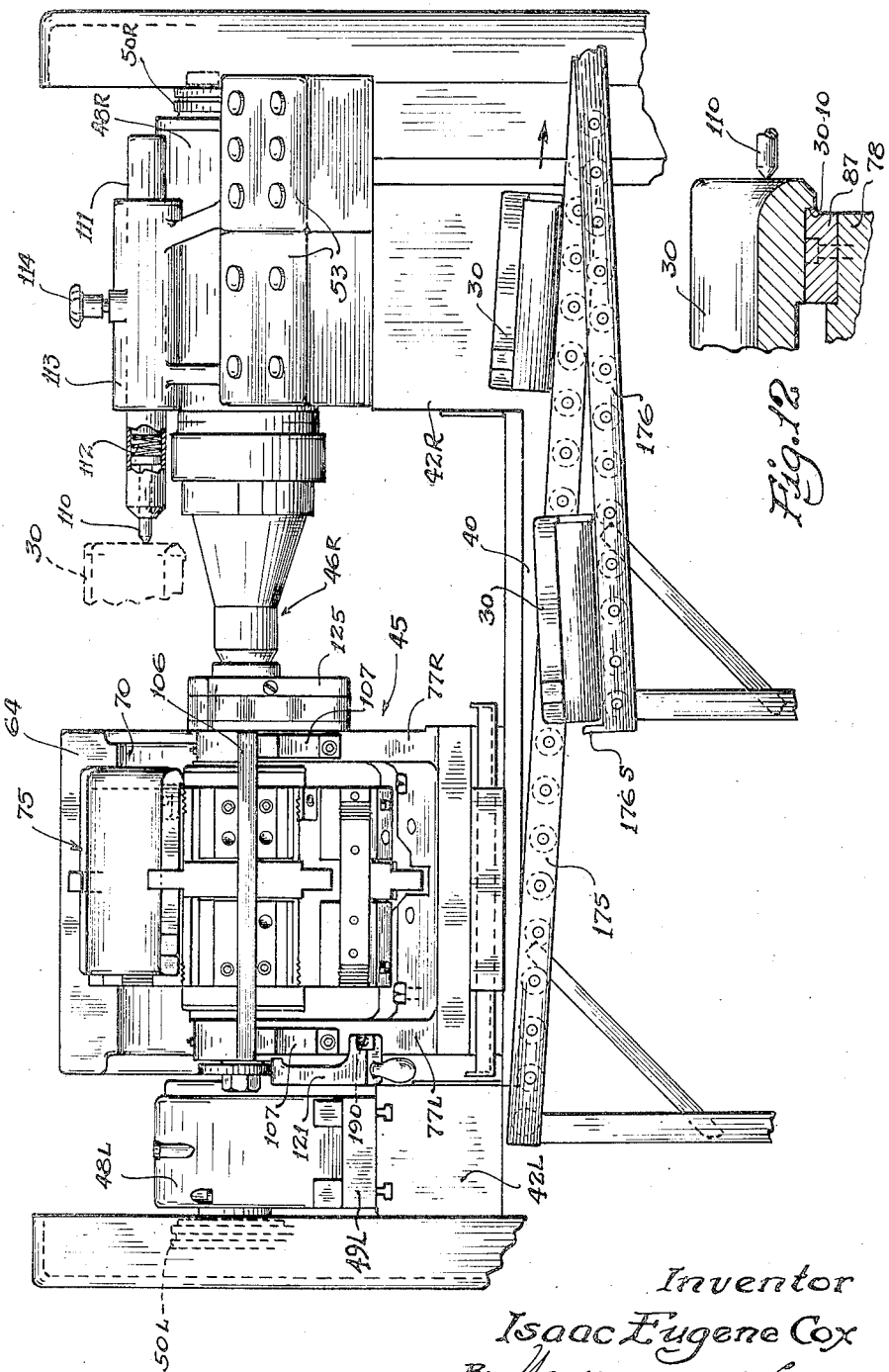
Inventor
Isaac Eugene Cox
By Wallace and Cannon
Attorneys

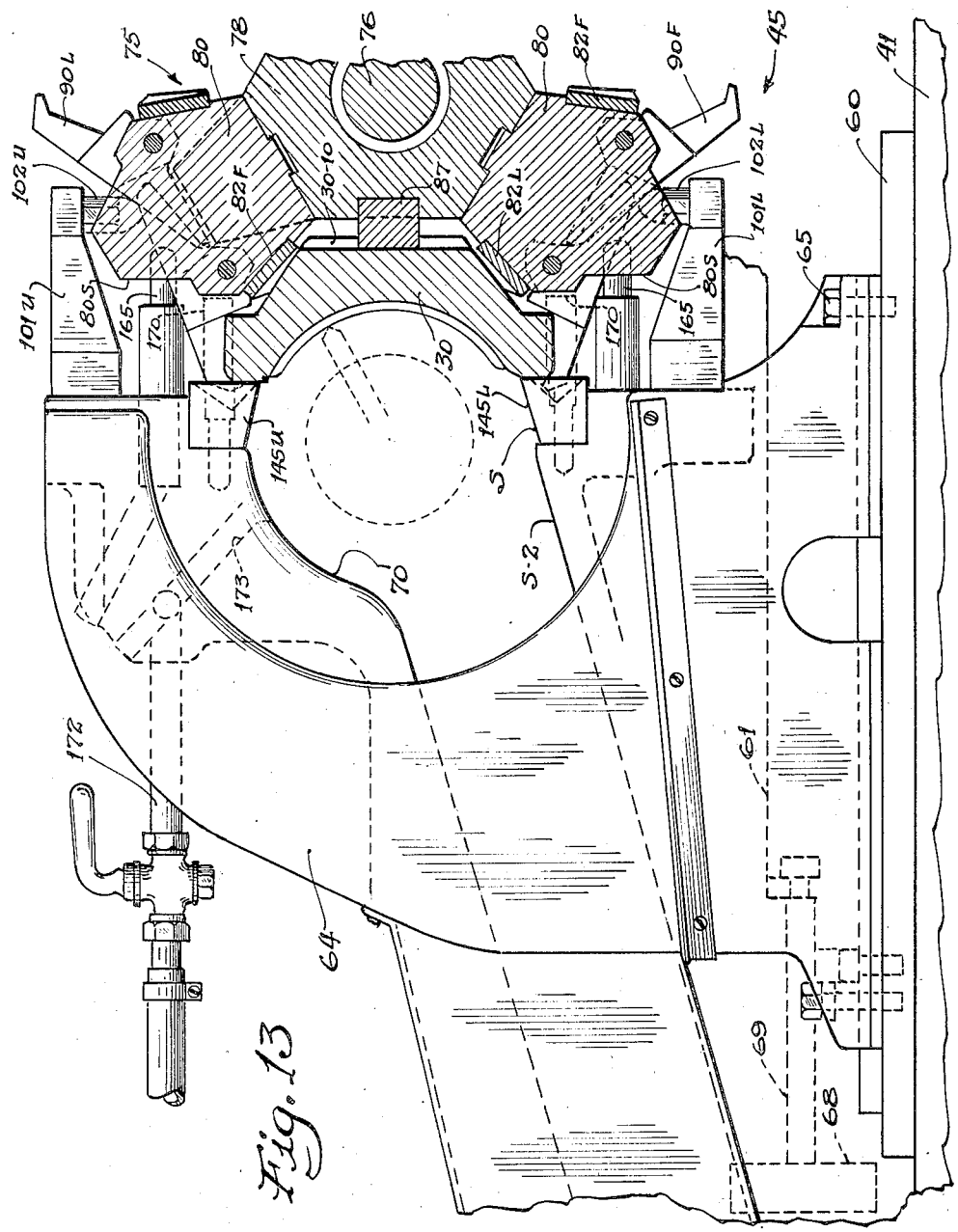

Feb. 7, 1950          I. E. COX          2,496,379
MACHINE TOOL
Filed Aug. 31, 1948          11 Sheets-Sheet 10
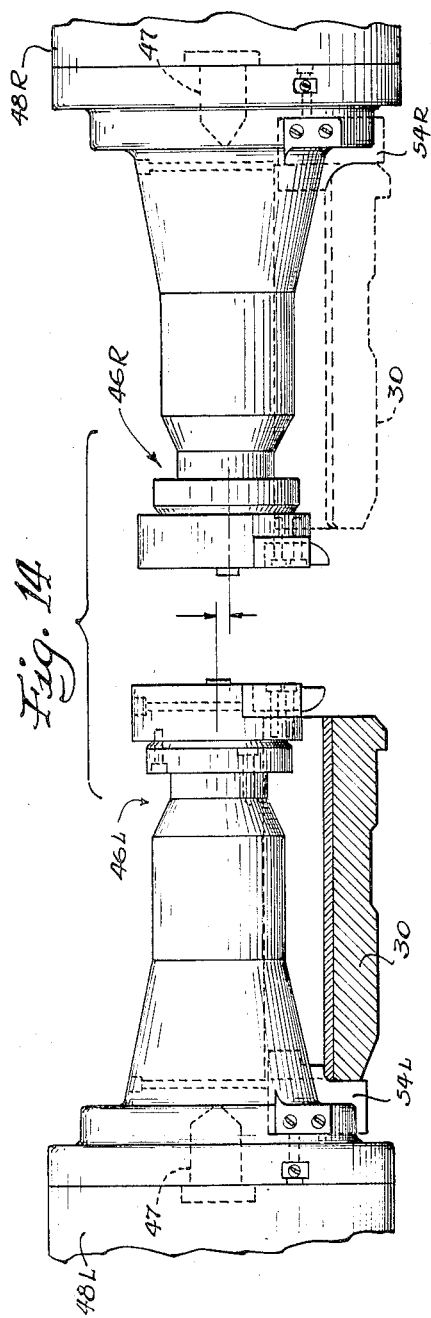
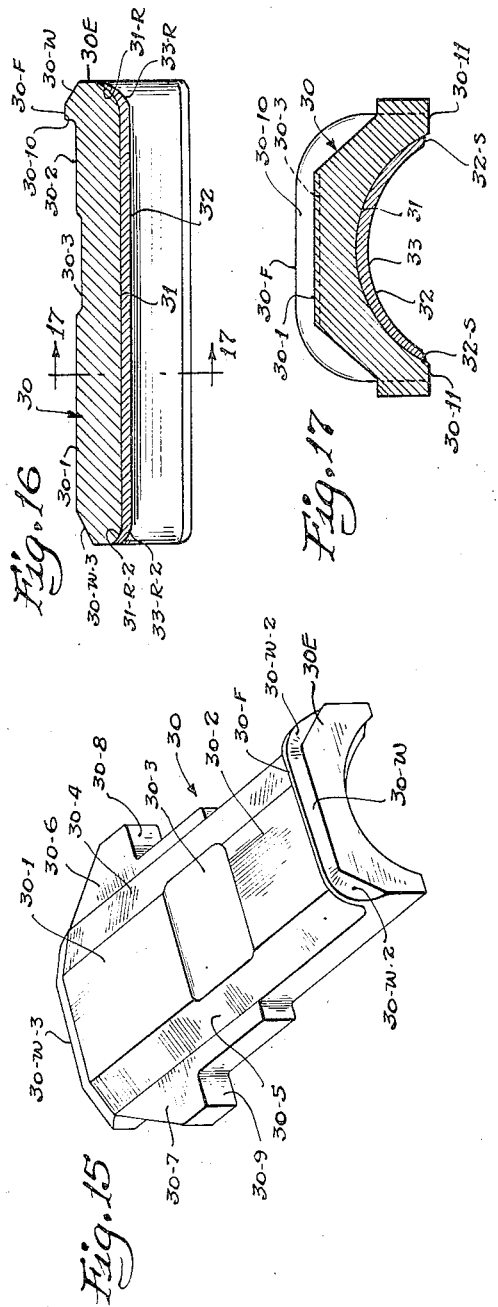
Inventor
Isaac Eugene Cox
By Wallace and Connor
Attorneys Feb. 7, 1950 — I. E. COX — 2,496,379
MACHINE TOOL
Filed Aug. 31, 1948 — 11 Sheets-Sheet 11
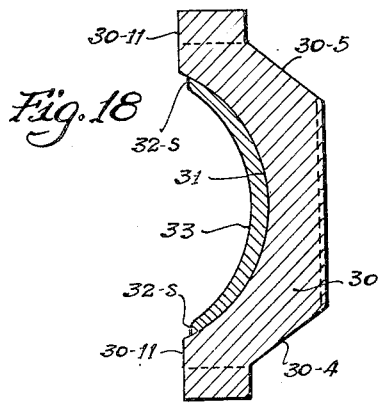
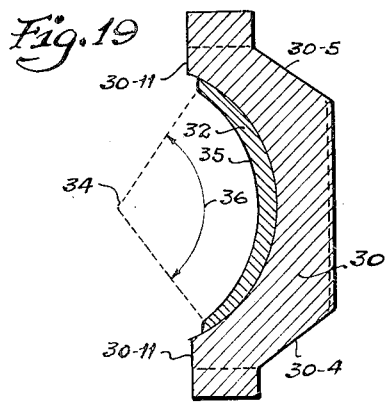
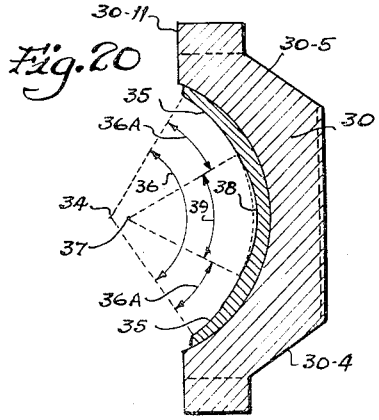
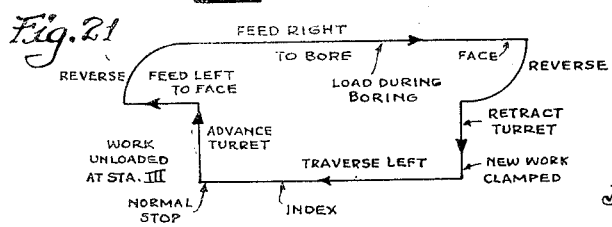
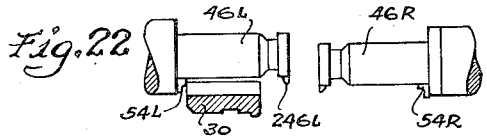
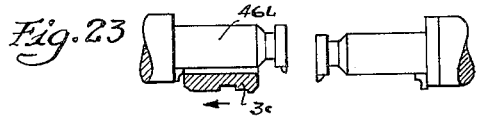
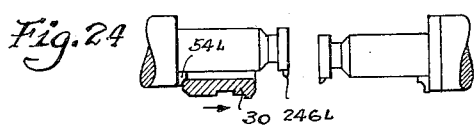
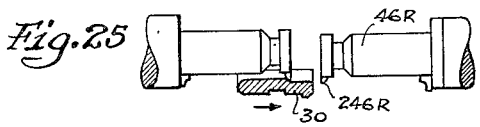
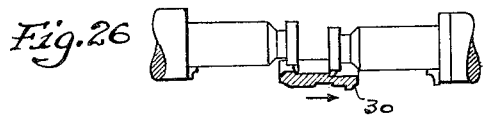
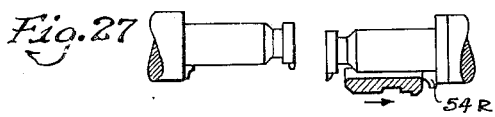
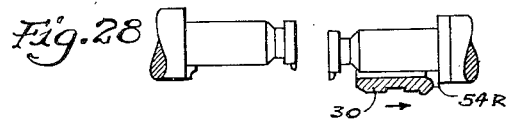
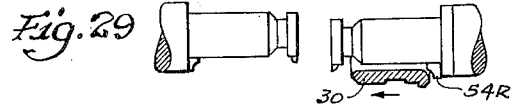
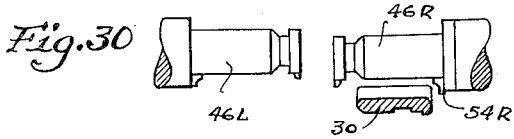
Inventor
Isaac Eugene Cox
By Wallace and Cannon
Attorneys Patented Feb. 7, 1950

2,496,379

UNITED STATES PATENT OFFICE 2,496,379

MACHINE TOOL

Isaac Eugene Cox, Kirkwood, Mo., assignor to American Brake Shoe Company, New York, N. Y., a corporation of Delaware Application August 31, 1948, Serial No. 47,051

14 Claims. (Cl. 77—1)

This invention relates to machine tools and particularly to machine tools for the machining of bearing surfaces of segmental bearings for rotative shafts and the like.

In the production of segmental bearings for rotative shafts and the like, it is usually the practice to form the bearing with an inner liner or surfacing of a bearing metal, such as Babbitt metal, and in most instances this Babbitt metal liner is machined so as to afford a proper bearing surface. It is an important object of the present invention to simplify the finishing or machining of such bearing surfaces. More specifically, it is an object of the present invention to simplify the attainment of proper alignment of the machined bearing surface with respect to the mounting surfaces of such bearings, and an object related to the foregoing is to simplify the process of mounting and aligning a bearing with respect to the boring means that is to effect the desired surfacing operation.

One situation where the problem of properly forming and locating the machined bearing surfaces in a bearing is encountered is in the production of journal bearings and the like for use in railway equipment. Such journal bearings have reached a relatively high state of standardization, and the present development has been undertaken with the idea of enabling true interchangeability of the bearings to be attained. It will be evident of course that under such circumstances it is essential that the product be made in every instance so as to come within the standards set by the railway association, thereby to make it possible to quickly mount the journal bearings in position in the journal boxes of the railway equipment, and it is to enable such accuracy in journal bearings to be attained in a simple and effective manner that the present invention is directed. It will be recognized of course that journal bearings for use on railway equipment are relatively large and heavy so that it is quite difficult to lift and manipulate such bearings in the course of mounting the bearings in position on the machine which is to accomplish the boring or surfacing operation, and it is a further and important object of the present invention to enable such bearings to be initially positioned in approximately the desired location on the machine that is to perform the work, and to thereafter impart shifting and clamping forces to such a bearing by power means so as to thereby quickly attain accurate location of the bearings in the machine. An object related to the foregoing is to enable such bearing after it has been initially located in the machine to be so shifted and moved by the work locating apparatus that such initial positioning of the bearing may be accomplished quickly and easily, and a further object is to enable such a bearing after completion of the work thereon to be shifted to a position or location such that removal of the complete bearing may readily be accomplished.

Where segmental bearings such as railway journal bearings are to be used under heavy loads, it has been found to be advantageous to initially machine the bearing surface so that the breaking-in process in the use of the bearing is facilitated, and this has been accomplished in the past by boring the bearing longitudinally in two distinct boring operations, the centers of which are slightly displaced so that the intersection of the two cylindrical surfaces affords, in effect, two longitudinal lines of potential contact formed along the bearing and spaced on opposite sides of the transverse center of the bearing surface. It has been found in the past that bearings that are thus formed are highly advantageous when the surfaces of the two bores are accurately related one to the other, but in those instances where the bearings lack uniformity of bearing contact with the shaft with which they are associated, the adverse and uneven wearing effect upon such a shaft has been found to be highly objectionable, and as a result of this, such specially formed bearings have not been accorded very wide acceptance. It is therefore a further object of the invention to enable such journal bearings and the like, with compound bearing surfaces of the character described, to be accurately and economically produced, and an object related to the foregoing is to enable the two distinct boring operations that are required in such bearings to be performed while a bearing is held in a fixed position on a work holder, thereby to assure proper alignment and relationship as between the compound bearing surfaces that are thus formed on the bearing.

In the machining of the bearing surfaces in bearings of the aforesaid character, it is possible, by reason of the good machining characteristics of the bearing material, to perform the machining operations quite rapidly. Such rapid operation, however, causes a correspondingly rapid production of chips, and in performing such machining operations, it therefore becomes necessary to continuously dispose of such chips so that they will not interfere with the machining operation. In the past it has been necessary in machines operating on bearings of the character hereinabove described to stop the machine quite frequently to remove the chips therefrom, and in view of this, and in order to avoid loss of machine time, it is another important object of the present invention to enable machining operations on bearings of the aforesaid character to be performed continuously, and a more specific object is to perform such machining operations in a way that facilitates the disposal of the chips. More specifically, it is an object of the present invention to perform such machining operations in such a way that the normal supply of coolant liquid will serve to wash the chips not only away from the tool and the machine surface, but also to wash the chips completely out of the machine and into the separating screen that is normally utilized in the coolant circuit.

Other objects of the invention are to enable journal bearings and the like to be positioned and clamped in position in a machine tool in a simple and expeditious manner; to relate the work holder and clamping mechanism to the machine so as to attain an advantageous automatic cycle of operation of the clamping means and the work performing elements of the machine; and to afford a work clamping and positioning fixture which functions not only in the work positioning and clamping operations, but also to dispose the work out of contact with the tools during the idle movements of the elements of the machine.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as described by those skilled in the art without departing from the present invention and the purview of the appended claims.

In the drawings:

Fig. 2 is a front elevational view of the fixture;

Fig. 3 is an enlarged perspective view showing one of the work clamping or retaining elements;

Fig. 5 is a perspective view of a portion of the work fixture;

Fig. 6 is a sectional view taken substantially along the line 6—6 of Fig. 2;

Fig. 7 is a view looking rearwardly and showing the forward face of the fixture as viewed from line 7—7 of Fig. 6;

Fig. 9 is a view taken substantially along the line 9—9 of Fig. 10;

Fig. 10 is a vertical sectional view taken through the rotative or indexing axis of the work supporting turret;

Fig. 11 is a fragmentary front elevational view of the machine showing the relationship of the work fixture to the machine and to the work supply and work disposal conveyors;

Fig. 12 is a fragmentary vertical sectional view illustrating the final work positioning means;

Fig. 13 is a vertical sectional view taken from front to rear in the machine and illustrating the way in which the chips are flushed away from the working position of the machine;

Fig. 14 is a plan sectional view taken substantially at the horizontal axes of the boring spindles and illustrating the relationship of the work to these spindles;

Fig. 15 is a perspective view of a standard railway journal bearing of the kind that is adapted to be finish-bored by the machine of the present invention;

Fig. 16 is a longitudinal vertical section through the bearing shown in Fig. 15;

Fig. 17 is a transverse sectional view taken substantially along the line 17—17 of Fig. 16;

Figs. 18, 19 and 20 are views similar to Fig. 17 and illustrating in a somewhat diagrammatic manner the form of the inner surface of the bearing at different stages in the manufacture thereof;

Fig. 21 is a diagrammatic view illustrating the cycle of machine operation; and

Figs. 22 to 30 are fragmentary and somewhat diagrammatic views illustrating successive positions assumed by the work piece with respect to the spindles in the course of a cycle of machining operations.

Figure 1:
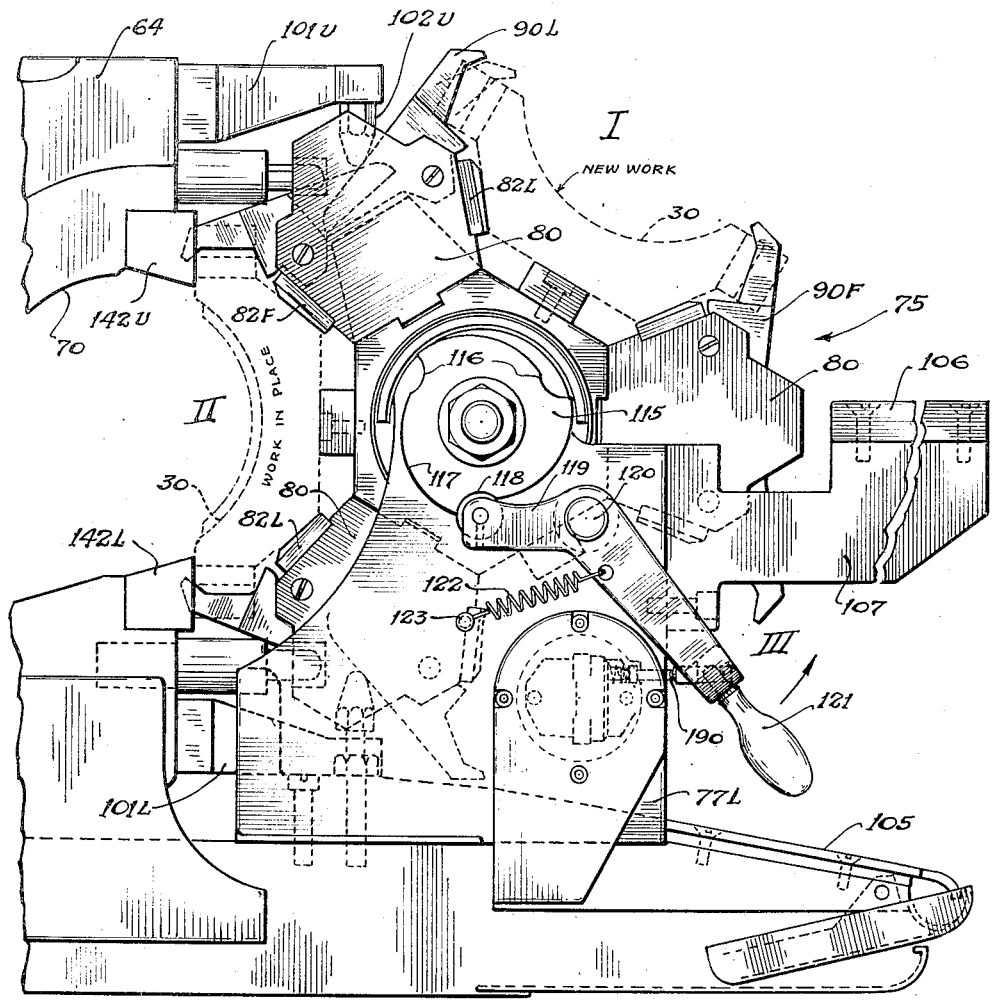
Fig. 1 is a left-hand end elevational view of the work fixture utilized in the machine of the present invention, the view being taken from the line 1—1 of Fig. 2.

The present invention is concerned with the machining of segmental bearings such as a standard AAR journal bearing 30 that is illustrated in detail in Figs. 15, 16 and 17 of the drawings, and as a preliminary to the description of the machine of the present invention, the structural characteristics of the bearing 30 will be described in detail.

Journal bearings such as the bearing 30 are usually cast from a material such as brass to afford a body 30B having a cylindrical internal surface 31 of the general form that is desired in the bearing surfaces of the bearing but of a somewhat larger diameter so as to accommodate an internal liner 32 which is cast in place on the internal surface 31 from a bearing material such as Babbitt metal. Since the bearing surfaces that are to be afforded by the liner 32 must be accurately located by mounting of the bearing 30 in a support such as a journal box, the body 30B of the bearing is provided with a plurality of locating surfaces which serve in such a mounting operation to properly position the bearing with respect to the mounting means such as a journal box. Thus, the body 30B has a pair of flat upper surfaces 30—1 and 30—2 that are in many instances separated by a depressed or cutaway area 30—3. Along opposite longitudinal edges of the surfaces 30—1 and 30—2, angular locating or wedge surfaces 30—4 and 30—5 are afforded, these elongated angular surfaces being accurately disposed in a parallel relation with respect to the longitudinal axis that is to be established for the bearing surfaces of the babbitt liner 32. Downwardly and outwardly from the surfaces 30—4 and 30—5, a pair of outwardly extending lugs 30—6 and 30—7 are provided and these lugs are disposed adjacent to one end of the bearing and they afford surfaces 30—8 and 30—9 respectively that face in an endwise direction toward the other end of the bearing. At such other end, which is usually termed the collar or flange end of the bearing, the bearing 30 is provided with an upstanding flange 30F that affords a shoulder 30—10 facing endwise of the bearing and toward the shoulders 30—8 and 30—9. The other edge of the flange 30F is provided with a wedge surface 30W that slopes downwardly from the top of the flange 30F to the adjacent end surface 30E of the bearing. At the ends of the flange 30F, the corners are rounded, and the wedge surface 30W is also rounded as at 30W—2 in Fig. 15.

At the end of the bearing 30, adjacent to the lugs 30—6 and 30—7, the upper corner surfaces of the body 30B are tapered to afford wedge surfaces 30W—3. The several abutment surfaces and wedge surfaces that are thus afforded on and about the top of the body 30B of the bearing serve in a well known manner to properly locate the bearing in a journal box or the like, and the bearing surface that is to be provided on the liner 32 is so related to the aforesaid locating surfaces that such bearing surface of the liner will be properly located when the bearing has been mounted in position in a journal bearing or the like.

With respect to the formation of the liner 32, it will be observed in Fig. 16 that the liner is filleted outwardly at the end thereof so as to afford arcuate or rounded endwise bearing surfaces adjacent to the ends of the body 30B. In affording this construction, the ends of the internal surface 31 of the body 30B are formed with radius corners 31R and 31R2, and in the casting of the liner 32, the inner longitudinal surface 33 of the liner 32 is cast at the ends thereof to afford rounded or filleted corners 33R and 33R2 which correspond roughly to the form that is to be imparted to the internal surface of the liner 32 in the machining operation. Furthermore, the casting of the liner 32 is conducted in such a way that shoulders 32S are formed along the edges of the liner as shown in Fig. 17, and these shoulders 32S are parallel to and are spaced from the bottom edge faces 30—11 of the body 30B of the bearing. The faces 30—11 are accurately formed and related with respect to the angular faces 30—4 and 30—5 and are parallel and accurately related to the axis or axes upon which the final bearing surface is to be bored. It will be observed that the liner 32 is somewhat thicker adjacent the central portion thereof, that is, when considered in a transverse cross sectional view such as Fig. 17, and after the liner 32 has been cast, the internal facing operations are performed to impart the desired bearing surfaces to the liner 32. Thus, as will be evident in Fig. 18 of the drawing, the internal surface of the liner 32 may be relatively rough in its original cast form, although in Fig. 18 this roughness has been considerably exaggerated. The first machining operation constitutes a boring operation wherein the axis of the boring tool is located at 34 as indicated in Fig. 19 of the drawings, and in this boring operation a continuous arcuate surface 35 is formed longitudinally of the bearing. As will hereinafter be pointed out in detail, the filleted or rounded edges 33R and 33R2, as shown in Fig. 16, are also formed on the liner 32 in the course of the machine cycle, and the times at which these end facing operations are performed will hereinafter be set forth. The surface 35 that is thus formed in what may be called the first boring operation extends through an arcuate range 36 indicated in Fig. 19, or in other words this surface 35 extends to the end shoulders 32S.

The liner 32 is then bored along another axis 37 that is somewhat forwardly or to the right of the axis 34 as shown in Fig. 20, and this boring operation is performed with a boring tool having a slightly smaller radius so that what may be termed an eccentric bearing surface 38 is formed in the inner face of the liner 32, and this bearing surface extends through a relatively narrow range 39 as indicated in Fig. 20. Thus, the bearing surface 35 that was originally formed now extends only through two ranges 36A that, as indicated in Fig. 20, are disposed on opposite sides of the bearing surface 38. Through this formation of the pair of cooperating bearing surfaces 35 and 38 in the bearing, two parallel lines of potential bearing contact are afforded at the intersections of the surfaces 35 and 38, and it is this relation which causes the breaking-in operation in respect to the bearing to be materially facilitated.

The bearings 30 with the rough cast liners 32 therein are under the present invention subjected to the required boring and surfacing operations in the double end boring machine that is fragmentally illustrated in front elevation in Fig. 11 of the drawings. This double end boring machine has an elongated bed 40 with an elongated work table 41, Figs. 2 and 7, mounted for longitudinal reciprocation thereon in a conventional manner and in such a relation that in the course of such reciprocation the ends of the table 41 may move beneath conventional bridge structures 42 that are mounted on the bed 40 adjacent opposite ends thereof. In the use of the machine, the bearing 30 that is to be surfaced is mounted on the table 41 of the machine by means of an indexing work supporting and clamping fixture 45 that will hereinafter be described in detail as to structure and mode of operation, and in the course of reciprocation of the table 41, the workpiece that is thus clamped and supported in an operative position by the fixture 45 will be brought in succession into operative engagement with boring tools 46L, Fig. 14, and 46R, Figs. 11 and 14, for the performance of the boring and facing operations that have been described hereinbefore. The boring tools 46L and 46R are mounted for rotation on spindles, as 47, that are in turn rotatably mounted in spindle bearing members 48L and 48R. The spindle bearing members 48L and 48R are supported adjustably on the bridges 42L and 42R by spacer blocks 49L and 49R which support the axes of the boring tools 46L and 46R in a common horizontal plane. As will be noted in Fig. 14, the axis of the boring tool 46L is displaced rearwardly from but is parallel to the axis of the tool 46R so as to conform with the spacing of the axes 34 and 37 hereinbefore described. The spindles 47 extend outwardly beyond the remote ends of the bearings 48L and 48R, and multiple V-belt driving connections 50L and 50R are extended downwardly from the spindles to suitable drive means of a conventional character located within the bed 40.

The table 41 is provided with adjustable or settable control dog structures of a conventional type (not shown) that operate in a conventional manner to control the feed and traverse movements of the table 41 and which also control the reversing and stopping of the table, and a pair of control panels 53 are disposed on the upper forward edge of the bearing member 46R to enable manual starting, stopping and like control functions to be attained manually through electrical control means in a conventional manner.

In the course of the reciprocation of the work parallel to the axes of the spindles, the tools 46L and 46R are effective to perform their boring operations, and in addition the rounded end surfaces 33R and 33R2 are formed by facing tools 54L and 54R that are mounted on the spindles of the tools 46L and 46R as shown in Fig. 14.

The work fixture 45 is mounted on the table 41 of the machine by means of a base plate 60 that is secured to the table 41 so as to extend from front to rear thereof, and this base plate 60 moves with the table 41 in the reciprocation thereof. On the base plate 60, a relatively narrow cross slide 61 is mounted for reciprocation in a front to rear direction by means such as ways 62, Figs. 2 and 7. This cross slide 61 extends for a substantial distance in a rearward direction, as will be evident in Fig. 13 of the drawings, and the rear portion of the cross slide 61 is arranged to extend beneath an upstanding column 64 that is fixed in position by means such as cap screws 65 on the mounting plate 60 of the fixture. The rearwardly extending portion of the cross slide 61 passes through a clearance space 66 formed in the lower portion of the column 64 as will be evident in Fig. 7 of the drawings. At the rear end of the plate 60, a piston and cylinder actuator 68 is mounted on the base plate 60 and has the piston rod 69 thereof extended forwardly and connected to the rear end of the cross slide 61 so that the piston and cylinder device 68 may function to reciprocate the cross slide between a forward position, illustrated in Fig. 6, and a rear or working position that is shown in Fig. 13 of the drawings.

The forward face of the column 64 is cut away as at 70 in Fig. 13 of the drawings so as to afford clearance for the cutting tools 46L and 46R, and forwardly of this clearance space 70, the work fixture 45 has a work supporting turret 75 that is adapted for indexing movement about a horizontal axis that is disposed in the horizontal plane with the axes of the two cutting tools. The turret 75 is supported upon a horizontal mounting shaft 76 which at its opposite ends is journaled for rotating movement in upstanding side frames 77L and 77R, Fig. 2, which are in turn mounted in fixed upstanding positions on the cross slide 61.

Figure 4:
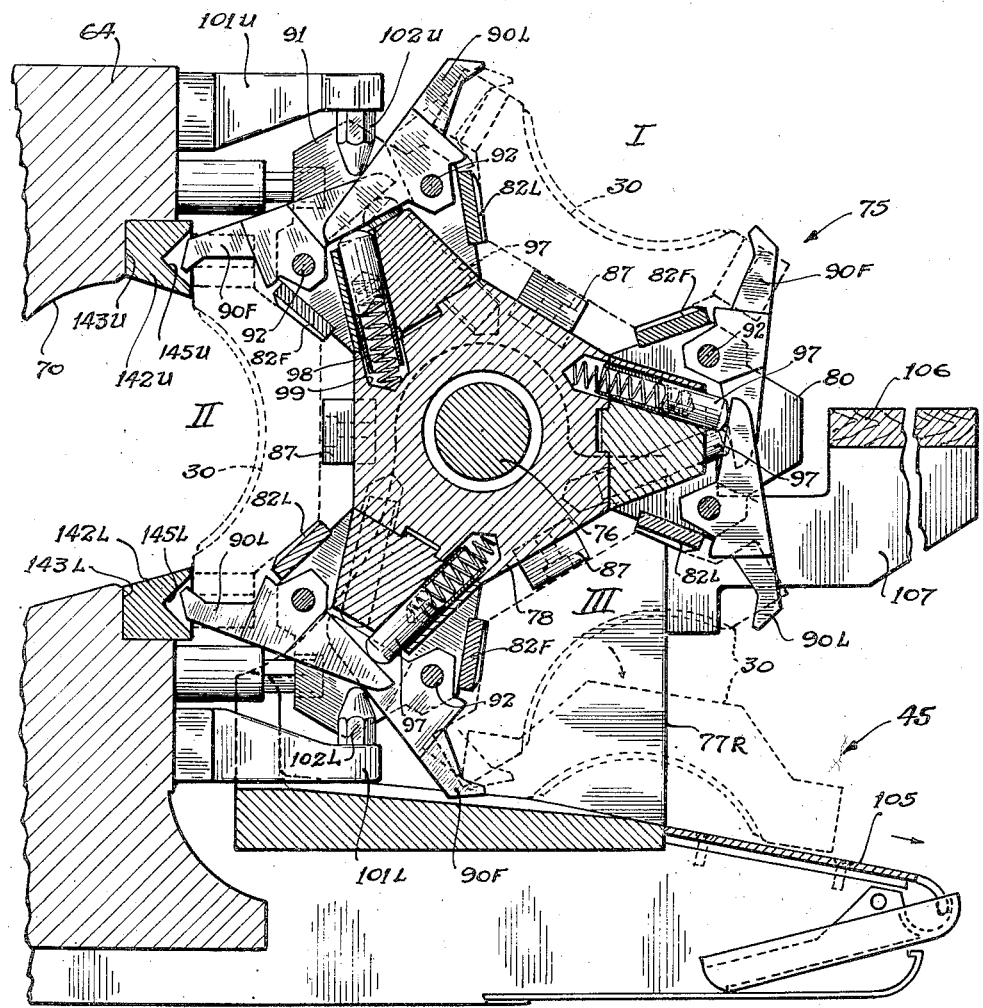
Fig. 4 is a vertical sectional view taken substantially along the line 4—4 of Fig. 2.
Figure 8:
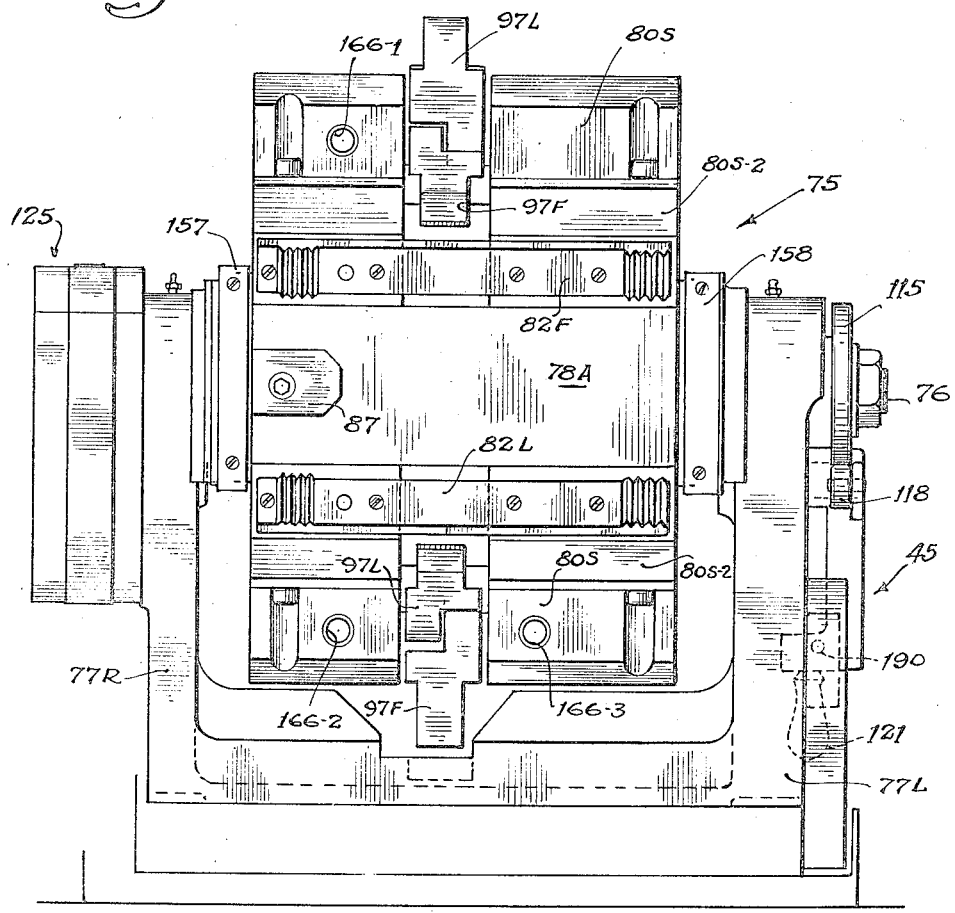
Fig. 8 is a view looking forwardly and showing the rear face of the work supporting turret in one of its positions, and as viewed from the line 8—8 of Fig. 6.

The turret 75 as herein shown is afforded by means including an elongated core 78 which surrounds the mounting shaft 76 and is adapted for rotation with the shaft 76. The turret 75 is in the present instance arranged to afford three equally spaced work stations, I, II and III, as indicated in Figs. 1, 4 and 5, and to facilitate the provision of three such work receiving stations, the core 78 is in the present instance of hexagonal form. Thus, the core 78 has alternate faces 78A and 78B about the outer surface thereof, and the faces 78A are arranged to be disposed opposite the respective work receiving stations. The faces 78B, as shown in Fig. 6, have locating grooves 79 formed longitudinally thereof to facilitate mounting and positioning of individual mounting blocks 80 thereon. Three such mounting blocks 80 are provided, and these mounting blocks extend longitudinally of the respective faces 78B and are held in position thereon by means such as cap screws 81 as shown in Fig. 5 of the drawings.

Each mounting block 80 serves to afford the mounting structure at one side of each of two adjacent work stations, as will be evident in Fig. 6 of the drawings, and thus each mounting block 80 is arranged to have side faces 80S disposed at a proper angle to facilitate engagement of the angle or wedge faces 30—4 and 30—5 of a bearing 30 by means carried on such faces 80S. Thus, as will be evident in Figs. 5 and 6, each face 80F has a locating bar 82L or 82F mounted thereon, and these locating bars are arranged to abut shoulders 83 at their inner edges. The locating bars are held in position by means such as cap screws 84 that extend through the locating bars and into the mounting blocks 80.

As will be evident in Figs. 2, 5 and 6, the locating bars 82L and 82F have transverse positioning teeth 85 formed thereon adjacent to opposite ends thereof, such teeth being hardened and ground to afford accurately located surfaces for engagement with the respective wedge surfaces 30—4 and 30—5 of the bearings 30. When a bearing 30 is to be mounted in position on the turret 75, this mounting operation is performed at station I of the turret, and as will be evident in Fig. 6, station I is so arranged that the surface 78A faces upwardly and forwardly, or to the right in Figs. 1 and 6. The bearing 30 is put in position with the flange end thereof disposed to the right, as viewed in Fig. 11 of the drawings, and when this is done, the wedge surface 30—4 rests on the teeth 85 of the locating bar 82F, while the wedge surface 30—5 rests against the teeth 85 of the locating bar 82L. When the work is thus mounted at station I, the shoulder 30—10 of the bearing is located to the right of a locating block 87 that is secured by a cap screw 88 to the surface 78A adjacent the right hand end of the core 78, and by moving the shoulder 30—10 to the left, and into engagement with the block 87, the bearing may be accurately located in an axial sense, as will hereinafter be described.

When the turret 75 has been located by placing a bearing 30 in the turret at station I, this bearing must then be moved by rotative indexing of the turret 75 so as to locate the bearing at station II, which constitutes the working station, and in order that the work piece such as the bearing 30 may be retained in the turret 75 in such indexing movement, means are provided on the turret 75 for releasably holding the bearings in position on the turret during such indexing movement. The work clamping means as provided in accordance with the present invention are arranged to operate automatically in timed relation to the shifting movements of the cross slide 61, and such work clamping means are arranged to automatically release and unload the work when such work has been finished and moved to station III in the course of the successive indexing movements of the turret. Thus, as shown in Figs. 1 to 5 and 8 of the drawings, a plurality of clamping arms 90L and 90F are provided, such clamping arms being mounted in the mounting blocks 80 so that one clamping arm 90L is provided along the leading edge of each work receiving postion on the turret while one clamping arm 90F is afforded along the trailing or following edge of each such work receiving position. These clamping arms are mounted adjacent to the mid point of the length of each such work receiving position, and to enable this to be done, each mounting block 80 has a relatively wide central groove 91 formed therein across the top and downwardly along the two sides of the mounting block. Within each such groove 91 a pair of mounting arms 90L and 90F are mounted on a pair of longitudinal mounting shafts 92. As will be evident in Figs. 2, 3 and 4, each clamping arm, as 90F, has a relatively wide body portion 93 through which a transverse mounting or pivot opening 94 is extended, and the arm as 90F, is arranged to extend from the body 93 substantially midway between the ends of such body. On the other side of the pivotal axis afforded by the bore 94, each such body has a projecting tail portion 95, and such tail portion 95 is disposed at one side of the center line of the arm as 90F. Thus, when two such clamping arms 90F and 90L are mounted in the mounting slot 91 of a mounting block 80, the reverse positioning of the two clamping arms locates the tail portions 95 thereof in a side by side relationship, as will be evident in Figs. 2 and 4 of the drawings. The two tail portions that are thus located within a common groove 91 may be identified as 95F and 95L, and these tail portions are displaced longitudinally of the block 80 so as to enable these tail portions to be selectively actuated by means displaced longitudinally with respect to the axis of the turret 75. Thus, each mounting block 80 is arranged to contain a pair of spring plungers 97 mounted in suitable bores within the block 80, and having springs 98 housed within such plungers and seated in aligned bores 99 in the core 78 so as to urge such spring plungers in an outward direction. One such spring plunger 97 acts on the tail 95 of each of the clamping arms so that such clamping arms are urged yieldingly toward the clamping positions wherein the curved ends of the arms engage opposite edges of the bearings, as will hereinafter be described.

The clamping arms 90L and 90F thus tend to assume their clamping positions, and means are afforded whereby certain of these arms are moved to released or unclamped positions to facilitate loading of bearings 30 at the loading station I and unloading of the finished bearings at station III. The unclamping of such clamping arms is under the present invention effected as an incident to the movement of the turret 75 in a rearward direction and into the working position of Fig. 4. Thus, means are provided for engagement with the tail portion of the clamping arm 90L at the loading station I, and with the tail portion of the arm 90F at the unloading station III. Such selective clamp-releasing means are afforded by a pair of arms 101U and 101L that are fixed in a forwardly projecting relationship on the forward face of the column 64. The upper arm 101U has an abutment lug 102U projecting downwardly in such relation that this lug will be engaged by the tail portion of the arm 90L that is in station I, as the fixture moves rearwardly into its working position. Similarly, the lower arm 101L has an upwardly projecting lug 102L that is arranged to be disposed in the path of rearward movement of the tail portion of the clamping arm 90F that is in station III.

Thus, when the work fixture 45 is in its rear or working position, the clamping arm 90L at station I will be in its retracted position, as shown in solid outline in Fig. 4, and hence the machine operator may readily place a bearing 30 on the turret at station I in the position shown in dotted outline in Fig. 4. At the time when the fixture 45 moves to its rear or working position, the clamping arm 90F that is in station III will similarly be moved to its released position that is shown in full lines in station III, Fig. 4, and this allows the finished bearing 30 at station III to move downwardly and rearwardly with the clamping arm 90F so as to thereby move out of engagement with the clamping arm 90L at this station. When this release occurs, the bearing drops onto a discharge surface 105 that slopes downwardly and forwardly as shown in Fig. 4, and the weight of the bearing 30 is in most instances sufficient to cause this bearing to move along the surface 105 in a forward direction to such a point that it may readily be lifted off of the surface 105 by the machine operator. When the finished bearing 30 is thus discharged in a forward direction along the surface 105, it is located in an accessible position beneath a working platform 106 which is afforded to simplify the loading of the work fixture. The platform 106 is supported by forwardly projecting bracket arms 107 that are secured to the forward edges of the standards 77L and 77R, and the platform 106 is disposed in a position substantially in a horizontal plane passing through the axis of the turret 75. The workman utilizes the platform 106 as what may be termed an intermediate support upon which the bearing may be supported and manipulated into a relationship such that it may conveniently be lifted into position on the turret 75 at loading station I.

The mounting of a bearing 30 in the loading station I of the turret 75 takes place, as hereinbefore described, while the fixture is in its rear or working position, and the related clamping arm 90L at station I remains in its released position of Fig. 4 throughout the remainder of the working cycle of the machine. When the fixture is shifted to its forward or retracted position at the end of the machine cycle, the clamping arm 90L at station I is, of course, permitted to return to its normal clamping relation so that the bearing at station I will be firmly held in its clamped position, and it will be recognized that prior to such clamping of the bearing by the clamping arm 90L it is essential that the bearing be accurately positioned in a longitudinal sense. Such accurate longitudinal position is, of course, attained by engagement of the shoulder 30—10 with the lug 87, and under the present invention, such accurate longitudinal positioning is attained automatically during the machine cycle and prior to movement of the clamping arm 90L to its effective or clamping position.

Thus, as will be evident in Figs. 11 and 12 of the drawings, a spring plunger 110 is mounted for longitudinal movement in a mounting bar 111, and the spring plunger is arranged to project to the left from the bar 111 and to be urged in this direction by a spring 112 housed within the mounting bar 111. The mounting bar 111 is supported in a bracket 113 that is fixed on the forward face of the bearing support 48R, and a clamping device 114 in the bracket 113 enables the mounting bar 111 to be adjusted longitudinally of the machine. The mounting bar 111 is adjusted so that when the fixture 45 approaches the right-hand end of its travel as viewed in Fig. 11, the flange end of the bearing 30 will engage the spring plunger 110. With this arrangement, the continued movement of the fixture 45 to the right and to the end of its stroke causes the spring plunger 110 to exert a yielding axial force in a left-hand direction on the bearing 30, and this brings the shoulder 30—10 firmly into engagement with the block 87, as will be evident in Fig. 12 of the drawings. Hence, when the fixture 45 is retracted at the end of the machine cycle, the bearing 30 will be accurately located on the turret 75, and the clamping arm 90L that is released at this time will serve to hold the bearing in this accurately located relationship.

After the working cycle has been completed and the newly loading bearing 30 has been accurately clamped into position at station I, it is, of course, essential that the turret 75 be indexed in a counter-clockwise direction as viewed in Fig. 4 so as to shift this newly loaded bearing into station II, while at the same time shifting the completed bearing 30 into station III for unloading. Under and in accordance with the present invention, this shifting or indexing of the turret 75 is attained by utilizing the unbalanced weight afforded by the distribution of the two work pieces on the turret. Thus, it will be evident that when a work piece is located at station II and a work piece is located at station I, the distribution of weight about the axis of the turret 75 tends to rotate the turret in a counter-clockwise direction. Under the present invention this force, tending to rotate the turret 75 in an advancing direction, is manually controlled, and the turret 75 is held in any selected rotative position by means that may be released manually when indexing movement of the turret is desired. In attaining such control of the indexing movements of the turret 75, a locating plate 115 is fixed on the left-hand end of the shaft 76 as viewed in Fig. 10. This locating plate has three equally spaced recesses 116 formed in the periphery thereof, and gradually sloping surfaces 117 are formed to connect adjacent edges of these recesses. The lowermost recess 116 is adapted to be engaged by a locating roller 118 that is carried on an arm 119. The arm 119 is pivoted at 120, and has a handle 121 extended downwardly and forwardly therefrom as viewed in Fig. 1 of the drawings. A spring 122 acting between the arm 121 and a spring anchor 123 normally urges the arm 119 in a clockwise direction so as to engage the roller 118 with the edge of the positioning plate 115. As the turret 75 rotates in an indexing or counter-clockwise direction, one of the recesses 116 moves into engagement with the roller 118 and the tension on the spring 122 is of such a magnitude that this engagement of the roller 118 with one of the recesses 116 will under normal circumstances hold the turret 75 against further indexing movement. The roller 118 thus serves to locate the turret 75 in any desired indexed position. When the working cycle has been completed, and the turret 75 has been withdrawn in a forward direction, the operator actuates the handle 121 momentarily in an upward and forward direction as viewed in Fig. 1, and this withdraws the roller 118 and allows the turret 75 to move in a counterclockwise or indexing direction. The roller 118 is then allowed to engage the surface 117 so that the roller 118 will ride into the next recess 116 so as to thereby stop the turret in its next indexed position.

As pointed out hereinabove, the roller 118 will normally stop the indexing movement of the turret and will hold the turret in its newly assumed position. This effectiveness of the roller 118 is, however, dependent to some extent upon the speed attained by the turret 75 in such indexing movement, and to assure proper operation of the fixture, means are provided under the present invention for limiting the speed that may thus be attained in the indexing movement of the turret. For this purpose, a speed limiting unit 125 is associated with the right-hand end of the turret shaft 76, as will be evident in Figs. 9 and 10 of the drawings. Such speed limiting unit 125 is in the present instance in the nature of a hydraulic pump of the gear type. This pump, as shown in Figs. 9 and 10, has a casing 126 affording an upper chamber 127 and a lower chamber 128. A gear 129 fixed on the shaft 76 is disposed within the upper chamber 127, and the casing 126 is properly secured to the side plate 77R by means such as cap screws 130. A machining pinion or gear 131 is disposed in the lower chamber 128, and the gears 129 and 131 thus constitute a gear pump which is utilized in affording the desired speed controlling action.

The direction of rotation of the gears 129 and 131 is indicated in Fig. 9 of the drawings, and in this relationship a discharge chamber 132 is provided on the right-hand side of the two gears while an intake chamber 133 is afforded on the other side of the two gears. The gear pump that is thus provided is arranged to operate on what may be termed a closed circuit, and a supply of oil or other hydraulic liquid is afforded in a chamber 134 near the top of the casing 126. This supply chamber 134 opens downwardly into the upper side of the upper chamber 127. The hydraulic liquid in the discharge chamber 132 is adapted to be discharged through a discharge passage 135 which terminates in a valve seat 136 adjacent to the intake chamber 133. Beyond the seat 136 and to the left in Fig. 9, the passage is enlarged and a ball check valve is afforded in this enlarged portion of the passage. Thus, a valve made in the form of a ball 137 is urged toward the seat 136 by a spring 138 and a stop pin in the form of a cap screw 139 is disposed in the enlarged portion of the passage to afford a guide for the spring 138 and also to serve as a stop to limit opening movement of the ball valve 137. Thus, the speed of rotation of the gear 129 is limited by the effective area of the valve orifice that is afforded when the ball valve 137 is in its open position, and by adjustment of the abutment screw 139, this speed of rotation may be effectually adjusted. The hydraulic speed control mechanism that is thus provided serves to limit the speed that may be attained by the turret 75 in its indexing movements, and this assures effectiveness of the positioning plate 115 and the positioning roller 118. There are occasions in the use of the machine, and particularly when the first bearing 30 is loaded on the turret 75 at loading station I when the weight distribution on the turret will tend to produce reverse or clockwise motion as viewed in Fig. 4, but under such circumstances the ball valve 137 acts as a check valve so that the gear 129 and the turret 75 are held against such undesired reverse rotation.

As hereinbefore described, the bearings are mounted in the work holding positions of the turret 75 and are accurately positioned with respect to the turret by means including the locating plates 82L and 82F and the abutment block 87, as shown in Fig. 4. It is, of course, necessary in addition to such accurate location of the work on the turret to assure proper location of the work with respect to the axes of the boring tools when the work piece is moved into the working station II. In accomplishing this desired accurate location, use is made of the accurately positioned faces 30—11 on the bearings 30, and these faces 30—11 are brought into contact with positioning or locating elements disposed on the column 64. Thus the column 64 has a pair of locating bars 142U and 142L mounted on the forward face thereof above and below the cut away portion 70. The locating bar 142U is mounted in an angular seat 143U as will be evident in Fig. 4, and cap screws 144 are utilized to secure the bar 142U in position. The locating bar 142L is similarly mounted in a seat 143L formed in the forward face of the column 64 along the lower edge of the cut out portion 76, and cap screws 144 are also employed in securing this locating bar in position. As will be evident in Figs. 4 and 7, these locating bars are disposed in such positions as to lie in the path of the noses of the clamping levers 90F and 90L that hold the bearing 30 in position on the turret, and in order to avoid contact of these parts, clearance recesses 145U and 145L are formed respectively in the upper and lower positioning bars 142U and 142L. The lower positioning bar 142L has two sets of positioning teeth 147L formed thereon and adjacent opposite ends thereof, such positioning teeth being hardened and ground to afford accurately related contact surfaces for engagement of one surface 30—11 of a bearing at points adjacent to the ends of such surface 30—11. The other or upper locating bar 142U has but one set of locating teeth 147U formed thereon, these teeth being located substantially midway between the ends of the bar 142U. Thus, the uppermost surface 30—11 of the bearing will be engaged at but a single area so that the bearing 30 will be located by three areas of contact with the surfaces 30—11 of the bearing disposed in a vertical plane that is parallel to the axes of the boring tools. It will be recognized, of course, that the cross slide 60 and the turret 75 will be urged rearwardly at all times during a machine cycle so that the surfaces of the locating bars 142U and 142L will accurately locate the work in the respect above described at all times during such cycle.

In addition to the locating action of the locating plates 142U and 142L, it will be recognized that the bearing must be accurately positioned so that the axis of the bearing upon which the finished surfaces are to be centered is located in a horizontal plane passing through the axes of the boring tools. In this respect, the engagement of the wedge surfaces 30—4 and 30—5 of the bearing with the locating bars 82L and 83F on the turret will dispose the bearing in a predetermined relationship with respect to the core 78 and mounting blocks 80 of the turret, and under the present invention the core 78 of the turret is so mounted and related that it may be shifted slightly to assure the desired location of the bearing with respect to the aforesaid horizontal plane. In attaining this result, the core 78 is mounted for limited rocking movement with respect to the supporting shaft 76. This arrangement is best illustrated in Fig. 10 of the drawings wherein it will be evident that intermediate its ends the shaft 76 has an annular bearing surface 150 of substantial width, and this annular bearing surface is of arcuate external cross section so that a portion of a spherical bearing surface is afforded. The core 78 has a relatively large central bore 151 formed from the left, and this central bore opens into an enlarged bore 152 so as to afford a shoulder 153 that faces to the right in Fig. 10. A bearing ring 154 is inserted from the right into the enlarged bore 152 so as to abut the shoulder 153 and be in position to engage one side of the bearing surface 150, and a similar bearing ring 155 is inserted from the right after the shaft 76 has been put in position. A spacer sleeve 156 is then put in position against the bearing ring 155, and an end plate 157 is secured by means such as cap screws 158S to the right-hand end in the core 78 so as to hold the bearing assembly together. A similar end plate 158 is secured on the other end of the core 78, and it should be observed that both of the end plates 157 and 158 are centrally bored at a diameter somewhat larger than the shaft 76, so as to permit limited rocking movement of the core about the spherical bearing surface 150. In order that the core 78 may rotate with the shaft 76, a transverse driving pin 160 is extended through the core 78 and the shaft 76 so as to pass through the center of the bearing surface 150, but it should be observed that the pin 160 has a relatively loose fit so that the desired rocking or aligning movement of the core 78 about the center that is afforded by the bearing surface 150 may take place.

With the relatively loose or adjustable mounting of the core 78 as thus afforded, the position of each bearing 30 may be accurately determined as such bearing is moved into working position, and this is attained through the use of co-acting aligning means on the mounting blocks 80 and the column 64. Thus, as will be evident in Figs. 5, 7 and 8, such aligning means are afforded by aligning pins 165 afforded on the column 64, and guide bushings 166 that are disposed in the faces of the mounting blocks 80. Thus, the mounting blocks 80 are so formed that surfaces 80S are provided thereon so that two such faces 80S on opposite sides of the bearing 30 at station II are parallel to the forward face of the column when the fixture is moved toward the column. The surface 80S that is adjacent to the locating bar 82F will be located in what may be termed an uppermost position, and this surface has but a single guide sleeve 166—1 mounted therein as viewed in Fig. 8. The other surface 80S which is located adjacent to the bar 82L has two guide sleeves 166—2 and 166—3, and guide pins 165 are afforded on the column to cooperate with the guide sleeves that are thus afforded. Thus, as will be evident in Fig. 7 of the drawings, the guide pin 165—1 is mounted on the column 64 just above the locating bar 142U for cooperation with the sleeve 166—1. Similarly, a guide pin 165—2 is located beneath the bar 147L in position for cooperation with the guide sleeve 166—2, while a mounting pin 165—3 is mounted below the bar 142L for cooperation with the guide sleeve 166—3. It will be observed that all three of the guide pins 165 have their tapered end portions of a somewhat diamond-shaped cross-sectional form, and in respect to the guide pins 165—1 and 165—2, the long axis of the diamond is in each instance disposed in a horizontal direction while the long axis of the diamond on the guide pin 165—3 is disposed in a vertical direction. The guide pins 165 are arranged to have a snug fitting relationship with respect to the related guide sleeves 166 so that as the turret 75 moves in a rearward direction towards its working position, the several guide pins 165 will enter the guide sleeves 166, and if the core 78 of the turret is not properly aligned, the cooperating guide pins and guide sleeves will rock the core and the related parts of the turret about the axis of the bearing surface 150. Such movement will be about an axis that is substantially normal to the vertical plane defined by the effective surfaces of the locating bars 142U and 142L so that when the surfaces 30—11 of the bearing 30 engage these locating bars, the final clamping of the bearing will accurately locate the wedge surfaces 30—5 as well as the flat faces 30—11 of the bearing in the desired relationship with respect to the axes of the boring tools.

It will be recognized that there is a possibility that the cross slide may inadvertently be started through its forward or advancing stroke at a time when there is no work piece disposed on the turret 75 in station II, and to avoid injury to the parts of the mechanism in such circumstances, safety stop means are provided which will stop movement of the cross slide before any part of the turret comes into contact with the cutting tools. Thus, as shown in Fig. 7, a pair of abutment rods 170 are mounted respectively in the areas occupied by the locating bars 142U and 142L. These safety stop bars are arranged to be engaged by surfaces 80S—2 that are formed on the blocks 80, and the relationship is such that these surfaces 80S—2 engage the stops 170 before any part of the turret reaches the zone in which the cutting tools operate.

In the course of the cutting operation, coolant liquid is supplied in large volume through means such as a supply pipe 172, Fig. 13, and is fed through one or more discharge passages 173 formed in column 64 so that such coolant liquid is discharged onto the cutting tools 46R and 46L in the cutting zone. This coolant liquid must, of course, be drained away from the working zone, and under and in accordance with the present invention, the arrangement is such that this coolant liquid in its return flow to the conventional screen and collecting sump may act effectually to flush the chips from the vicinity of the work and the cutting tools. Thus, as shown in Fig. 13 of the drawings, the upper face of the locating bar 142L slopes downwardly and rearwardly from the point of engagement with the work, as indicated at S in Fig. 13 of the drawing, and it will be observed that the cutting tools rotate in a clockwise direction as viewed in Fig. 13, so that the chips that are formed in the cutting operation are directed downwardly and rearwardly and onto the sloping surface S of the locating bar 145L. At its rear edge the sloping surface S merges with a further sloping surface S—2 that slopes downwardly and rearwardly at a relatively steep angle, and thus the coolant liquid which is discharged into the cutting zone will flow downwardly rearwardly at a rapid rate along the surfaces S and S—2 so that such flow of the coolant liquid will act to carry the chips along these surfaces and toward a conventional separating screen of the kind used in coolant supply systems. The coolant liquid will, of course, be accelerated in its movement due to the action of the cutting tool and the chips that are set in motion by the cutting action of the tool. Thus, the coolant supply, the direction of cutter movement, and the location of the work cooperate with each other and with the location of the sloping drain surfaces to produce an efficient chip disposal in the present machine.

It has been pointed out hereinbefore that when the finished work is shifted from the working station II into the unloading station III, the subsequent movement of the fixture into its forward or working position serves to release the finished work piece and discharge the same onto a forwardly sloping surface 105. In most instances it is found that work when thus discharged actually slides downwardly and forwardly along the surface 105, and in the use of the present machine this characteristic is utilized by placing a roller conveyor 175 so that it extends along the forward or discharge end of the sloping surface 105. Hence, the finished bearing may, under such circumstances, slide off of the surface 105 and onto the roller conveyor 175, which slopes downwardly as shown in Fig. 11 to the right, to a main work handling position where workmen may stack the finished bearings. This work handling position also constitutes the source of the new work that is to be loaded into the turret at station I, and to facilitate handling of the new work, a supply conveyor 176 is afforded, as shown in Fig. 11, which slopes from such work handling position to the left to a point adjacent the loading position of the machine. At the end of the conveyor 176 a stop 176S is provided so that each new work piece comes to rest at a point where it may be easily grasped and lifted by a workman standing in front of the work supporting shelf 106. The workman may thus lift the new work piece from its position adjacent the stop 176S, and may place this new work piece on the shelf 106 so that it may be readily manipulated and placed in position between the separated or relatively open clamping arms 90L and 90F at this station of the turret while the turret is in its forward or working position.

As hereinbefore pointed out, the table 41 of the machine and the movements of the cross slide 61 are effected by conventional actuating and control mechanism, and the cycle is such that the table 41 normally comes to rest near the left-hand end of its stroke and with the cross slide 61 in its withdrawn position. The working cycle is illustrated in Fig. 21 of the drawings, wherein it will be apparent that when the cycle is initiated, the cross slide 61 is advanced from its retracted rear position to its forward or working position, thereby to properly clamp into position the new work piece with respect to the cutting tools. The table 41 then moves at feed speed to the left so that the facing tool 54L may perform the facing operation required to afford the surface 33R—2. The table movement is then reversed, and the work is moved to the right at feed speed to accomplish the boring operations as well as the facing operation by the facing tool 54R. Upon completion of this last facing operation, the table movement is reversed, and after a short back-up movement at feed speed, the cross slide is moved outwardly and the table is caused to move to the left at rapid transverse speed toward the normal stop position. In Fig. 21 of the drawings, the various work loading, unloading and work clamping and unclamping actions are indicated in their relation to the cycle above described.

In the machining of bearings such as the bearing 30, the bearing that is clamped in station I of the turret 75 is first shifted into station II by indexing of the turret 75 when the cross slide 61 is in its forward or retracted position, and this work piece is then moved forwardly to its accurately located working position and is brought in succession into operative contact with the several cutting tools. Such movements of the work piece are brought about in the cycle of operation just described with reference to Fig. 21, and the successive relationships of the work to the cutting tools are diagrammatically illustrated in Figs. 22 to 30 of the drawings.

Thus, when a work piece 30 is first moved into station II of the turret, it occupies the relationship that is diagrammatically shown in Fig. 22 of the drawings. In other words, the new work piece is disposed directly forwardly of the quill of the tool 46L and is out of alignment with respect to the cutting element 246L of the tool as well as the facing cutter 54L. In the advancing movement of the cross slide 61, the work piece 30 is advanced forwardly toward the tool 46L and into the relationship shown in Fig. 23 of the drawings, and it is in this front to rear relationship that the work piece is maintained during the reciprocation of the table 41 of the machine. Thus, when the table starts its feed movement to the left, the work piece 30 is moved toward the facing tool 54L and the facing operation is performed and is completed when the work piece reaches the relationship shown in Fig. 24 of the drawings. At this point the automatic control mechanism of the boring machine causes reversal of the table 41 so that the table moves at feed speed to the right and the work moves into operative engagement with the cutting tool 246L so that the bearing surface 35 will be formed progressively along the inner surface of the liner 32 as indicated diagrammatically in Fig. 25 of the drawings. Continuation of this right hand feed movement of the table 41 moves the right hand end of the bearing 30 into operative relation with respect to the cutting element 246R of the right-hand cutting tool 46R, as indicated in Fig. 26 of the drawings. Thus, at this point in the cycle, both of the cutting elements 246L and 246R are effective upon the work piece, and the right-hand movement of the table is continued until both of the cutting elements 246L and 246R have performed their cutting operations in respect to the work piece. The work piece thus moves to the position shown in Fig. 27 and into engagement with the facing tool 56R, and this feed movement is continued from the relationship shown in Fig. 27 to that shown in Fig. 28 so as to thereby complete the facing operation with respect to the right-hand end of the bearing. The table 41 is then reversed so that the work piece 30 will be backed off to the left to the relationship shown in Fig. 29 of the drawings, after which the cross slide 61 is moved forwardly so as to retract the work piece 30 to the relationship shown in Fig. 30 of the drawings. At this time the speed of movement of the table 41 to the left is increased to traverse speed so that the work fixture 45 is rapidly returned to the normal stop position indicated in Fig. 21 of the drawings. As hereinabove pointed out, this rapid traverse movement of the table to the left affords an interval during which the turret 75 is fully withdrawn from the normal working position, and during which the indexing of the turret 75 is to be accomplished. The operator therefore actuates the handle 121 so as to release the turret and permit the same to index one position in a counter-clockwise direction as viewed in Fig. 4. It will be recalled that a new work piece 30 will have been mounted in station I of the turret during the right hand feed movement of the table, and when the handle 121 is operated to cause indexing movement of the turret 75, this new work piece will be moved into the working station II of the turret.

The conventional actuating and control mechanism for the table 41 and the cross line 61 are preferably arranged so that the table will normally be stopped when it reaches the stop position indicated in Fig. 21 of the drawings, but I have found that continuity of operation of the machine may be promoted by affording a start switch 190 arranged in a conventional manner in parallel with the usual cycle-starting switch of such mechanism and arranged to be operated by the handle 121 when this handle is actuated for the purpose of causing indexing movement of the turret 75. This serves to cause continuous operation of the table and cross slide actuating means so long as the requisite indexing operation is properly performed in each return or left-hand stroke of the table 41.

From the foregoing description it will be evident that the present invention enables extreme accuracy to be attained in railway journal bearings or the like in a simple and effective manner, and it will also be evident that the present invention enables the bearings which are quite heavy to be initially positioned in approximately the desired location in the work holding means of the machine and to be thereafter shifted and clamped by power means so as to attain a final accurate location of the bearing during the boring and other operations. It will also be apparent that under the present invention it is possible to rapidly produce bearings having a compound bearing surface, and it is possible to accomplish this in an extremely economical manner. Under the present invention the handling of the bearings is relatively simple, and may be performed rapidly so as to enable substantially continuous operation of the machine to be attained. Moreover, the present invention relates the work to the cutting tools and to the coolant disposal system in such a way that the large volume of chips produced in the cutting operation are effectually carried away from the working position so as to avoid interference with the cutting tools.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a boring machine for machining arcuate bearing surfaces in segmental bearings and the like, a bed having a longitudinal reciprocable table mounted thereon, at least one cutting tool rotatably mounted on said bed and over said table and parallel to the path of reciprocation of said table, means for rotating said cutting tool so that the cutting elements thereof move downwardly on the side thereof that is adjacent the forward side of said bed, a cross slide mounted on said table for horizontal reciprocation from front to rear thereof, pressure fluid operated means on said table for imparting such reciprocation to such said cross slide, an upstanding column mounted on said table adjacent the rear edge thereof for reciprocation with said table, said column having a cut out portion affording clearance for said cutting tool and said column also having a forward face having forwardly facing positioning surfaces disposed above and below such cut out portion for engagement by opposite edge surfaces of such a segmental bearing or the like, said positioning surfaces being disposed in a vertical plane, said column also having a chip disposal passage formed therein and extending rearwardly and downwardly from the upper edge of the lowermost one of said positioning surfaces, a work supporting member mounted on said cross slide adjacent the forward end thereof and having work receiving position adapted to face rearwardly to support a segmental bearing in a rearwardly facing location, and interengageable guiding and positioning means on said supporting member and said column for accurately positioning said work supporting member as said work supporting member is moved rearwardly.

2. In a boring machine for machining arcuate bearing surfaces in segmental bearings and the like, a bed having a table mounted for longitudinal reciprocation thereon, at least one cutting tool rotatably mounted over said table and parallel to the path of reciprocation of said table, means for rotating said cutting tool so that the cutting elements thereof move downwardly on the side thereof that is adjacent the forward side of said bed, a cross slide mounted on said table for horizontal reciprocation from front to rear thereof, pressure fluid operated means on said table for imparting such reciprocation to such said cross slide, an upstanding column mounted on said table adjacent the rear edge thereof for reciprocation with said table, said column having a cut out portion affording clearance for said cutting tool and said column also having a forward face having positioning surfaces above and below such cut out portion and disposed in a vertical plane, said column also having a chip disposal passage formed therein and extending rearwardly and downwardly from the upper edge of the lowermost one of said positioning surfaces, coolant supply means on said column for discharging coolant onto said tool, a work supporting member mounted on said cross slide adjacent the forward end thereof and having work receiving position adapted to face rearwardly to support a segmental bearing and a rearwardly facing location, said work supporting member being mounted for limited universal movement relative to said cross slide, and interengageable guiding and positioning means on said supporting member and said column for shifting said member about its universal mounting to accurately position the work carried by said work supporting member as said work supporting member is moved rearwardly.

3. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a cut out portion is afforded extending in a direction parallel to the path of movement of said table, a boring tool mounted on said bed in a fixed longitudinal position and longitudinally extended into said cut out portion of said column and parallel to the path of reciprocation of said table, said column having upper and lower forwardly facing locating members disposed on the forward face thereof above and below said cut out portion, said column also having a chip disposal chute extending downwardly and rearwardly from the upper edge of said lower locating member, said column also having an opening from front to rear thereof beneath said chip disposal chute, a cross slide mounted on said mounting plate for reciprocation from front to rear thereof and into the aforesaid opening in said column and beneath said chip disposal chute, hydraulic actuating means mounted on said mounting plate rearwardly of said cross slide and beneath said chute and operatively connected to said cross slide for imparting reciprocating movements thereto, a work supporting structure mounted on the forward end of said cross slide and operable when said cross slide is moved rearwardly by said hydraulic actuating means to clamp opposite edges of such a segmental bearing against said upper and lower locating members.

4. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a cut out portion is afforded extending in a direction parallel to the path of movement of said table, a boring tool mounted on said bed in a fixed longitudinal position and disposed so as to extend in and along said cut out portion of said column and parallel to the path of reciprocation of said table, said column having upper and lower forwardly facing positioning means disposed on the forward face thereof above and below said cut out portion, said column also having a chip disposal chute extending downwardly and rearwardly therethrough from the upper edge of said lower positioning means, said column also having an opening from front to rear thereof beneath said chip disposal chute, a cross slide mounted on said mounting plate for reciprocation from front to rear thereof and into the aforesaid opening in said column and beneath said chip disposal chute, hydraulic actuating means mounted on said mounting plate rearwardly of said cross slide and beneath said chute and operatively connected to said cross slide for imparting reciprocating movements thereto, a work supporting structure mounted on the forward end of said cross slide and comprising a pair of upstanding side plates fixed on said cross slide, a shaft rotatably supported in said side plates forwardly of said column and in a horizontal plane passing through the axis of said tool, a turret mounted on said shaft for indexing movement therewith, means affording a plurality of work supporting positions at spaced points about said turret, releasable work clamping arms disposed on opposite sides of each such work locating positions, said turret being adapted to move through indexing strokes to shift a work piece from a forwardly and upwardly facing loading position to a rearwardly facing working position, and then to a downwardly and forwardly facing unloading position, means operable when said cross slide is moved into a rearward position to release one of said clamping arms at said loading station and another of said arms at said unloading station, means supporting said turret on said shaft for limited universal movement, and guide means on said turret and said column for shifting said turret about said universal mounting to accurately locate the work in said turret relative to said column and said tool when said turret is moved rearwardly with said cross slide.

5. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a horizontally extending cut out portion is afforded extending in a direction parallel to the path of movement of said table, a boring tool mounted on said bed in a fixed longitudinal position and disposed in said cut out portion of said column and parallel to the path of reciprocation of said table, said column having upper and lower lo- cating members horizontally disposed in a forwardly facing relation on the forward face thereof above and below said cut out portion, said column also having a chip disposal chute extending downwardly and rearwardly from the upper edge of said lower locating member, said column also having an opening from front to rear thereof beneath said chip disposal chute, a cross slide mounted on said mounting plate for reciprocation from front to rear thereof and into the aforesaid opening in said column and beneath said chip disposal chute, hydraulic actuating means mounted on said mounting plate rearwardly of said cross slide and beneath said chute and operatively connected to said cross slide for shifting the same from a forward loading station to a rear working station, a work supporting structure mounted on the forward end of said cross slide and comprising a pair of upstanding side plates, a shaft rotatably supported in said side plates forwardly of said column and in a horizontal plane passing through the axis of said tool, a turret mounted on said shaft for indexing movement therewith and for limited universal movement relative thereto, means affording a plurality of work supporting positions at spaced points about said turret, releasable work clamping means at each of each such work locating positions for releasably holding segmental bearings in the respective work locating positions, yielding means normally urging said work clamping means to effective positions, said turret being adapted to move through indexing strokes to shift a work piece from a forwardly and upwardly facing loading position to a rearwardly facing working position, and then to a downwardly and forwardly facing unloading position, means operable when said cross slide is moved to a rearward loading station direction to release the clamping means at said loading position and said unloading position, and guide means on said turret and said column for shifting said turret on the said universal mounting to accurately locate the turret relative to said column and said tool when said turret is moved to said rearward working station.

6. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a cut out portion is afforded extending in a direction parallel to the path of movement of said table, a boring tool mounted on said bed in a fixed longitudinal position and disposed in said cut out portion of said column and parallel to the path of reciprocation of said table, said column having upper and lower positioning means disposed on the forward face thereof above and below said cut out portion, said column also having a chip disposal chute extending downwardly and rearwardly from the upper edge of said lower locating member, said column also having an opening from front to rear thereof beneath said chip disposal chute, a cross slide mounted on said mounting plate for reciprocation from front to rear thereof and into the aforesaid opening in said column and beneath said chip disposal chute, hydraulic actuating means mounted on said mounting plate rearwardly of said cross slide and beneath said chute and operatively connected to said cross slide for imparting reciprocating movements thereto, a work supporting structure mounted on the forward end of said cross slide and comprising a pair of upstanding side plates, a shaft rotatably supported in said side plate forwardly of said column and in a horizontal plane passing through the axis of said tool, a turret mounted on said shaft for indexing movement therewith, means affording a plurality of work supporting positions at spaced points about said turret, releasable work clamping arms disposed on opposite sides of each such work locating positions, a locating block on said turret at each of said stations for engagement by an endwise surface of such a bearing to locate such bearing in an accurate endwise position on the turret, said turret being adapted to move through indexing strokes to shift a work piece from a forwardly and upwardly facing loading position to a rearwardly facing working position, and then to a downwardly and forwardly facing unloading position, means operable when said cross slide is moved into a rearward direction to release one of said clamping arms at said loading position and another said arm at said unloading position, means supporting said turret on said shaft for limited universal movement, guide means on said turret and said column for shifting said turret by the said universal mounting to accurately locate the turret relative to said column and said tool when said turret is moved rearwardly with said cross slide, and yielding means mounted on said bed in the path of a bearing disposed in said loading position and adapted to be engaged by such a bearing in the course of reciprocation of said table to engage an endwise surface of the bearing with said locating block.

7. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a cut out portion is afforded extending in a direction parallel to the path of movement of said table, a boring tool mounted on said bed in a fixed longitudinal position and disposed in said cut out portion of said column and parallel to the path of reciprocation of said table, said column having upper and lower positioning means disposed on the forward face thereof above and below said cut out portion, said column also having a chip disposal chute extending downwardly and rearwardly from the upper edge of said lower locating member, said column also having an opening from front to rear thereof beneath said chip disposal chute, a cross slide mounted on said mounting plate for reciprocation from front to rear thereof and into the aforesaid opening in said column and beneath said chip disposal chute, actuating means mounted on said mounting plate rearwardly of said cross slide and beneath said chute and operatively connected to said cross slide for imparting reciprocating movements thereto, a work supporting structure mounted on the forward end of said cross slide and comprising a pair of upstanding side plates, a shaft rotatably supported in said side plates forwardly of said column and in a horizontal plane passing through the axis of said tool, a turret mounted on said shaft for indexing movement therewith, means affording a plurality of work supporting positions at spaced points about said turret, releasable work clamping means at each such work locating positions, a locating abutment on said turret at each of said stations for engagement by an endwise surface of such a bearing to locate such bearing in an accurate endwise position on the turret, said turret being adapted to move through indexing strokes to shift a work piece from a forwardly and upwardly facing loading position to a rearwardly facing working position, and then to a downwardly and forwardly facing unloading position, means on said column operable when said cross slide is moved into a rearward direction to release said clamping means at said loading position and at said unloading position, means supporting said turret on said shaft for limited universal movement, guide means on said turret and said column for shifting said turret by the said universal mounting to accurately locate the turret relative to said column and said tool when said turret is moved rearwardly with said cross slide, and yielding means mounted on said bed in the path of a bearing disposed in said loading position and adapted to be engaged by such a bearing in the course of reciprocation of said table to engage an endwise surface of the bearing with said locating abutment.

8. In a fixture for mounting segmental bearings and the like in a boring machine, a mounting plate adapted to be secured on the table of a boring machine in a front to rear relation, a column mounting in fixed position on said supporting plate adjacent the rear end thereof, said column having a forward face in which a transversely extending cut out portion is afforded, said column having upper and lower forwardly facing positioning means disposed on the forward face thereof above and below said cut out portion, said column also having a chip disposal chute extending downwardly and rearwardly therethrough from the upper edge of said lower positioning means, said column also having an opening from front to rear thereof beneath said chip disposal chute, a cross slide mounted on said mounting plate for reciprocation from front to rear thereof and into the aforesaid opening in said column and beneath said chip disposal chute, actuating means mounted on said mounting plate rearwardly of said cross slide and beneath said chute and operatively connected to said cross slide for imparting yielding actuating forces to said cross slide for reciprocating the same, a work supporting structure mounted on the forward end of said cross slide and comprising a pair of upstanding side plates fixed on said cross slide, a shaft rotatably supported in said side plates forwardly of said column opposite said cut out portion, a turret mounted on said shaft for indexing movement therewith, means affording a plurality of work supporting positions at spaced points about said turret, releasable work clamping arms disposed on opposite sides of each such work locating positions, said turret being adapted to move through indexing strokes to shift a work piece from a forwardly and upwardly facing loading position to a rearwardly facing working position, and then to a downwardly and forwardly facing unloading position, means on said column operable when said cross slide is moved into a rearward position to release one of said clamping arms at said loading station and another of said arms at said unloading station, means supporting said turret on said shaft for limited universal movement, and guide means on said universal mounting to accurately locate the work in said turret relative to said column when said turret is moved rearwardly with said cross slide.

9. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a cut out portion is afforded extending in a direction parallel to the path of movement of said table, a boring tool mounted on said bed in a fixed longitudinal position and longitudinally extended into said cut out portion of said column and parallel to the path of reciprocation of said table, said column having upper and lower forwardly facing locating members disposed on the forward face thereof above and below said cut out portion, said column also having a chip disposal chute extending downwardly and rearwardly from the upper edge of said lower locating member, said column also having an opening from front to rear thereof beneath said chip disposal chute, a cross slide mounted on said mounting plate for reciprocation from front to rear thereof and into the aforesaid opening in said column and beneath said chip disposal chute, hydraulic actuating means mounted on said mounting plate rearwardly of said cross slide and beneath said chute and operatively connected to said cross slide for imparting reciprocating movements thereto, a work supporting structure mounted on the forward end of said cross slide and operable when said cross slide is moved rearwardly by said hydraulic actuating means to clamp opposite edges of such a segmental bearing against said upper and lower locating members, means for accurately locating such a bearing on said supporting structure, and cooperating means for accurately locating said supporting structure relative to said column as said work supporting structure approaches such a clamping relation.

10. In a machine tool for producing accurately machined bearing surfaces in segmental bearings and the like, a bed having a table reciprocable horizontally thereon adjacent the forward edge of said bed, a mounting plate secured on said table and extending front to rear thereon, a column mounting in fixed position on said supporting plate adjacent the rear end thereof, said column having a forward face in which a horizontally extending cut out portion is afforded extending in a direction parallel to the path of movement of said table, a boring tool mounted on said bed in a fixed longitudinal position and disposed in said cut out portion of said column and parallel to the path of reciprocation of said table, said column having upper and lower locating members horizontally disposed in a forwardly facing relation on the forward face thereof above and below said cut out portion, said column also having a chip disposal chute extending downwardly and rearwardly from the upper edge of said lower locating member, said column also having an opening from front to rear thereof beneath said chip disposal chute, a cross slide mounted on said mounting plate for reciprocation from front to rear thereof and into the aforesaid opening in said column and beneath said chip disposal chute, actuating means mounted on said mounting plate rearwardly of said cross slide and beneath said chute and operatively connected to said cross slide for shifting the same from a forward loading station to a rear working station, a work supporting structure mounted on the forward end of said cross slide and comprising a pair of upstanding side plates, a shaft rotatably supported in said side plates forwardly of said column and in a horizontal plane passing through the axis of said tool, a turret mounted on said shaft for indexing movement therewith and for limited universal movement relative thereto, means affording a plurality of work supporting positions at spaced points about said turret, releasable work clamping means at each of each such work locating positions for releasably holding segmental bearings in the respective work locating positions, yielding means normally urging said work clamping means to effective positions, said turret being adapted to move through gravity induced indexing strokes to shift a work piece from a forwardly and upwardly facing loading position to a rearwardly facing working position, and then to a downwardly and forwardly facing unloading position, means operable when said cross slide is moved to a rearward loading station direction to release the clamping means at said loading position and said unloading position, guide means on said turret and said column for shifting said turret about the said universal mounting to accurately locate the turret relative to said column and said tool when said turret is moved to said rearward working station, manual means for releasing said turret for gravity induced indexing movement, and an orifice controlled speed governing means for preventing reverse rotation of said turret and limiting the speed of the gravity induced indexing movements.

11. In a boring machine for machining arcuate bearing surfaces in segmental bearings and the like, a bed having a longitudinal reciprocable table mounted thereon, at least one cutting tool rotatably mounted on said bed and over said table and parallel to the path of reciprocation of said table, means for rotating said cutting tool, a cross slide mounted on said table for horizontal reciprocation from front to rear thereof, pressure fluid operated means on said table for imparting such reciprocation to such said cross slide, an upstanding column mounted on said table adjacent the rear edge thereof for reciprocation with said table, said column having a cut out portion affording clearance for said cutting tool and said column also having a forward face having forwardly facing positioning surfaces disposed above and below such cut out portion for engagement by opposite edge surfaces of such a segmental bearing or the like, said positioning surfaces being disposed in a vertical plane, said column also having a chip disposal passage formed therein and extending rearwardly and downwardly from the upper edge of the lowermost one of said positioning surfaces, a turret mounted on said cross slide on a horizontal axis parallel to said tool and adjacent the forward end of the cross slide and having three work receiving positions, one of which is adapted to face rearwardly to support a segmental bearing in a rearwardly facing working location, another position facing upwardly and forwardly and constituting a loading station, and the third position facing downwardly and forwardly and constituting an unloading position, interengageable guiding and positioning means on said column and on said turret at each of said positions for accurately positioning said turret as said turret is moved rearwardly, manually releasable locating means for holding said turret and for releasing said turret for gravity induced indexing movement, and hydraulic speed control means for limiting the indexing speed of said turret.

12. In a boring machine for machining arcuate bearing surfaces in segmental bearings and the like, a bed having a longitudinal reciprocable table mounted thereon, at least one cutting tool rotatably mounted on said bed and over said table and parallel to the path of reciprocation of said table, a cross slide mounted on said table for horizontal reciprocation from front to rear thereof, pressure fluid operated means on said table for imparting such reciprocation to such said cross slide, an upstanding column mounted on said table adjacent the rear edge thereof for reciprocation with said table, said column having a cut out portion affording clearance for said cutting tool and said column also having a forward face having forwardly facing positioning surfaces disposed above and below such cut out portion for engagement by opposite edge surfaces of such a segmental bearing or the like, said positioning surfaces being disposed in a vertical plane, said column also having a chip disposal passage formed therein and extending rearwardly and downwardly from the upper edge of the lowermost one of said positioning surfaces, a turret mounted on said cross slide on a horizontal axis parallel to said tool and adjacent the forward end of the cross slide and having three work receiving positions, one of which is adapted to face rearwardly to support a segmental bearing in a rearwardly facing working location, another position facing upwardly and forwardly and constituting a loading station, and the third position facing downwardly and forwardly and constituting an unloading position, a work supporting shelf mounted on said turret to receive and support new work pieces prior to mounting of such work pieces in said loading station, interengageable guiding and positioning means on said column and on said turret at each of said positions for accurately positioning said turret as said turret is moved rearwardly, and manual means for releasing said turret for gravity induced indexing movement.

13. In a work supporting and clamping fixture for mounting segmental bearings and the like in a boring machine, a mounting plate adapted to be secured on the table of such a machine and having an upstanding column fixed on the rear end of said plate, a cross slide mounted for reciprocation on said plate, a turret mounted on a horizontal axis on said cross slide forwardly of said column, said turret having means thereon defining three equally spaced work supporting positions thereon, means for locating said turret in different indexed positions in each of which one such work supporting position faces rearwardly while the other two work supporting positions are located respectively in an upwardly and forwardly facing loading relation and in a downwardly and forwardly unloading relation, work locating elements at each of said positions for engagement with surfaces on the backs of such segmental bearings, pivoted arms located on opposite sides of each such position and adapted to engage edge portions on opposite sides of such a bearing to hold the same against such locating elements, spring means urging each of said arms in a clamping direction, and means on said column operable when said cross slide is moved rearwardly to release one of said arms at each of said other two positions.

14. In a work supporting and clamping fixture for mounting segmental bearings and the like in a boring machine, a mounting plate adapted to be secured on the table of such a machine and having a column fixed on the rear end of said plate, a cross slide mounted for reciprocation on said plate, a turret mounted on a horizontal axis on said cross slide forwardly of said column, said turret having means thereon defining three equally spaced work supporting positions thereon, means for locating said turret in different indexed positions in each of which one such work supporting position faces rearwardly at a working station while the other two work supporting positions are located respectively in an upwardly and forwardly facing loading station and in a downwardly and forwardly unloading station, work locating elements at each of said positions for engagement with surfaces on the backs of such segmental bearings, pivoted arms located on opposite sides of each such position and adapted to engage edge portions on opposite sides of such a bearing to hold the same against such locating elements, spring means urging said arms in clamping direction, means on said column operable when said cross slide is moved rearwardly to release one of said arms at each of said loading and unloading stations, means on said cross slide affording a work supporting shelf forwardly of said loading position, and means on said cross slide beneath said unloading station and affording a downwardly and forwardly sloping work discharge surface.

ISAAC EUGENE COX.

No references cited.